(12) United States Patent
Watanabe

(10) Patent No.: US 10,929,985 B2
(45) Date of Patent: Feb. 23, 2021

(54) SYSTEM AND METHODS FOR TRACKING MOTION OF BIOLOGICAL CELLS

(71) Applicant: Sony Corporation, Tokyo (JP)

(72) Inventor: Shinji Watanabe, Tokyo (JP)

(73) Assignee: Sony Corporation, Tokyo (JP)

( * ) Notice: Subject to any disclaimer, the term of this patent is extended or adjusted under 35 U.S.C. 154(b) by 215 days.

(21) Appl. No.: 15/765,103

(22) PCT Filed: Sep. 26, 2016

(86) PCT No.: PCT/JP2016/004345
§ 371 (c)(1),
(2) Date: Mar. 30, 2018

(87) PCT Pub. No.: WO2017/061080
PCT Pub. Date: Apr. 13, 2017

(65) Prior Publication Data
US 2018/0268557 A1    Sep. 20, 2018

(30) Foreign Application Priority Data
Oct. 8, 2015 (JP) .............................. JP2015-199991
Jul. 29, 2016 (JP) .............................. JP2016-150604

(51) Int. Cl.
*G06T 7/246* (2017.01)
*G06T 7/73* (2017.01)

(52) U.S. Cl.
CPC .............. *G06T 7/248* (2017.01); *G06T 7/246* (2017.01); *G06T 7/74* (2017.01); *G06T 2207/10016* (2013.01); *G06T 2207/10056* (2013.01); *G06T 2207/20116* (2013.01); *G06T 2207/30024* (2013.01); *G06T 2207/30204* (2013.01)

(58) Field of Classification Search
None
See application file for complete search history.

(56) References Cited

U.S. PATENT DOCUMENTS

| 8,167,802 | B2 | 5/2012 | Baba et al. | |
| 2010/0080415 | A1* | 4/2010 | Qureshi | G16H 30/20 |
| | | | | 382/103 |
| 2017/0083748 | A1* | 3/2017 | Zhou | G06T 7/248 |

FOREIGN PATENT DOCUMENTS

JP    5508035 B2    3/2014

OTHER PUBLICATIONS

International Search Report and Written Opinion dated Jan. 18, 2017 in connection with International Application No. PCT/JP2016/004345.

(Continued)

*Primary Examiner* — Matthew C Bella
*Assistant Examiner* — Brian D Shin

(57) ABSTRACT

According to some aspects, an information processing device is provided. The information processing device includes circuitry configured to dispose a plurality of tracking points within a first region of a first image and set a second region of a second image based on estimated positions of the plurality of tracking points in the second image. The estimated positions are determined by comparing the first image and the second image. The circuitry is further configured to re-dispose the plurality of tracking points within the second region of the second image.

23 Claims, 21 Drawing Sheets

(56) References Cited

OTHER PUBLICATIONS

[No Author Listed] CellTrack—An Open-Source Software for Cell Tracking and Motility Analysis (project website), Database Research Group, Dept of Computer Science and Engineering, The Ohio State University, Jun. 25, 2015, http://web.archive.org/web/20150625041010/http://bio.cse.ohio-state.edu/CellTrack/, XP055331318, [retrieved Dec. 22, 2016], 10 pages.

Ando et al., Vector fluid: A Vector Graphics Depiction of Surface Flow, Eye Gaze in Intelligent Human Machine Interaction: Eye Gaze & Multimodality, ACM, New York, NY, Jun. 7, 2010, XP058242685, pp. 129-135.

Chu et al., Registration for DSA Image Using Triangle Grid and Spatial Transformation Based on Stretching, Signal Processing, The $8^{th}$ International Conference on, IEEE, PI, XP 31058698, Jan. 1, 2006, 4 pages.

Wong et al., Shape-guided active contour based segmentation and tracking of lumbar vertebrae in video fluoroscopy using complex wavelets, Engineering in Medicine and Biology Society, 2008 EMBS, $30^{th}$ Annual International Conference of the IEEE, Aug. 20, 2008, pp. 863-866.

International Preliminary Report on Patentability dated Apr. 19, 2018 in connection with International Application No. PCT/JP2016/004345.

European Communication pursuant to Article 94(3) EPC dated Oct. 17, 2019 in connection with European Application No. 16 779 193.8.

\* cited by examiner

[Fig. 1]
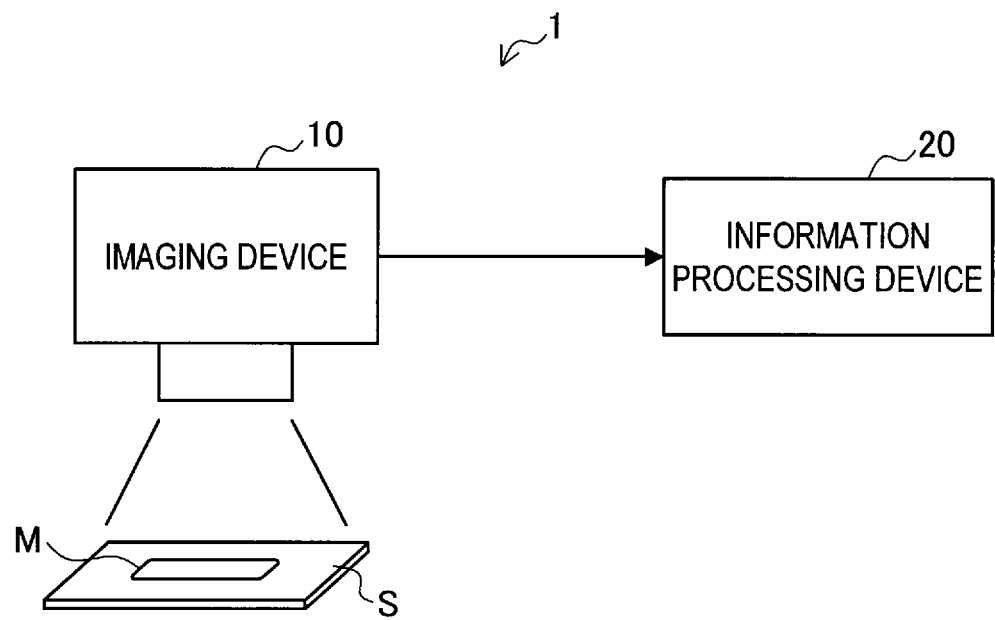

[Fig. 2]
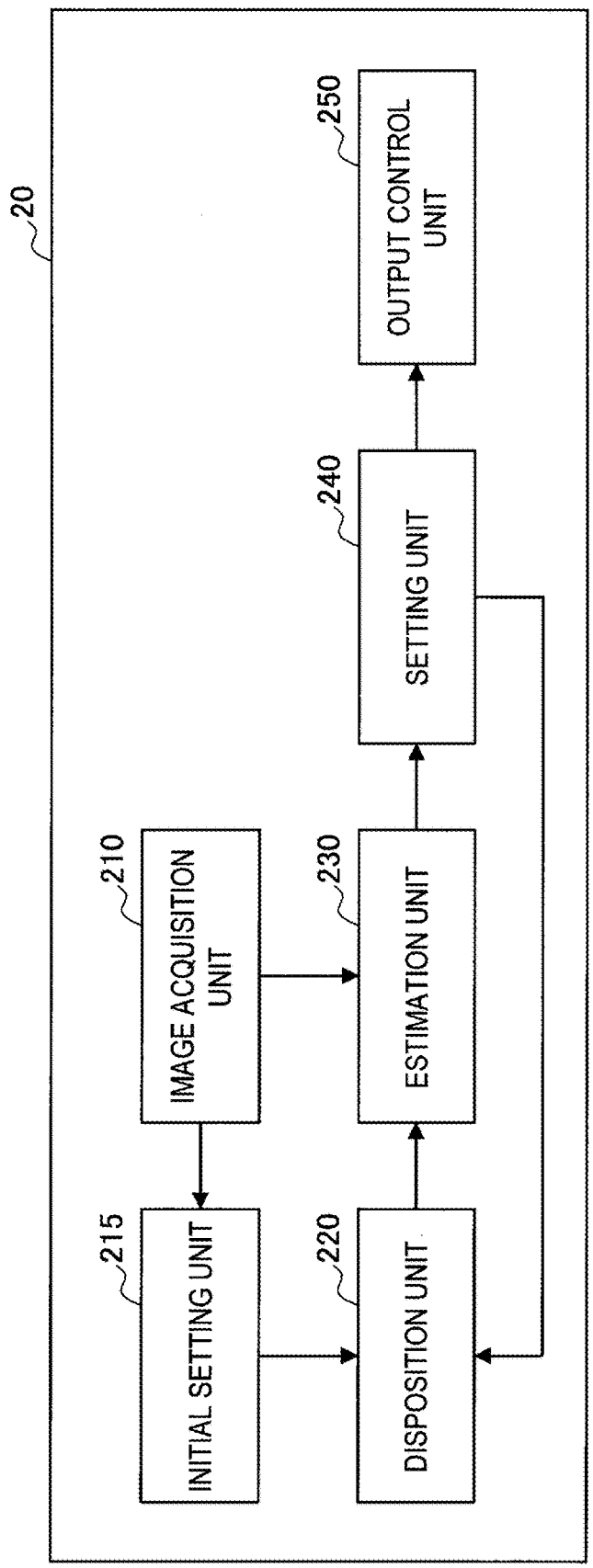

[Fig. 3]
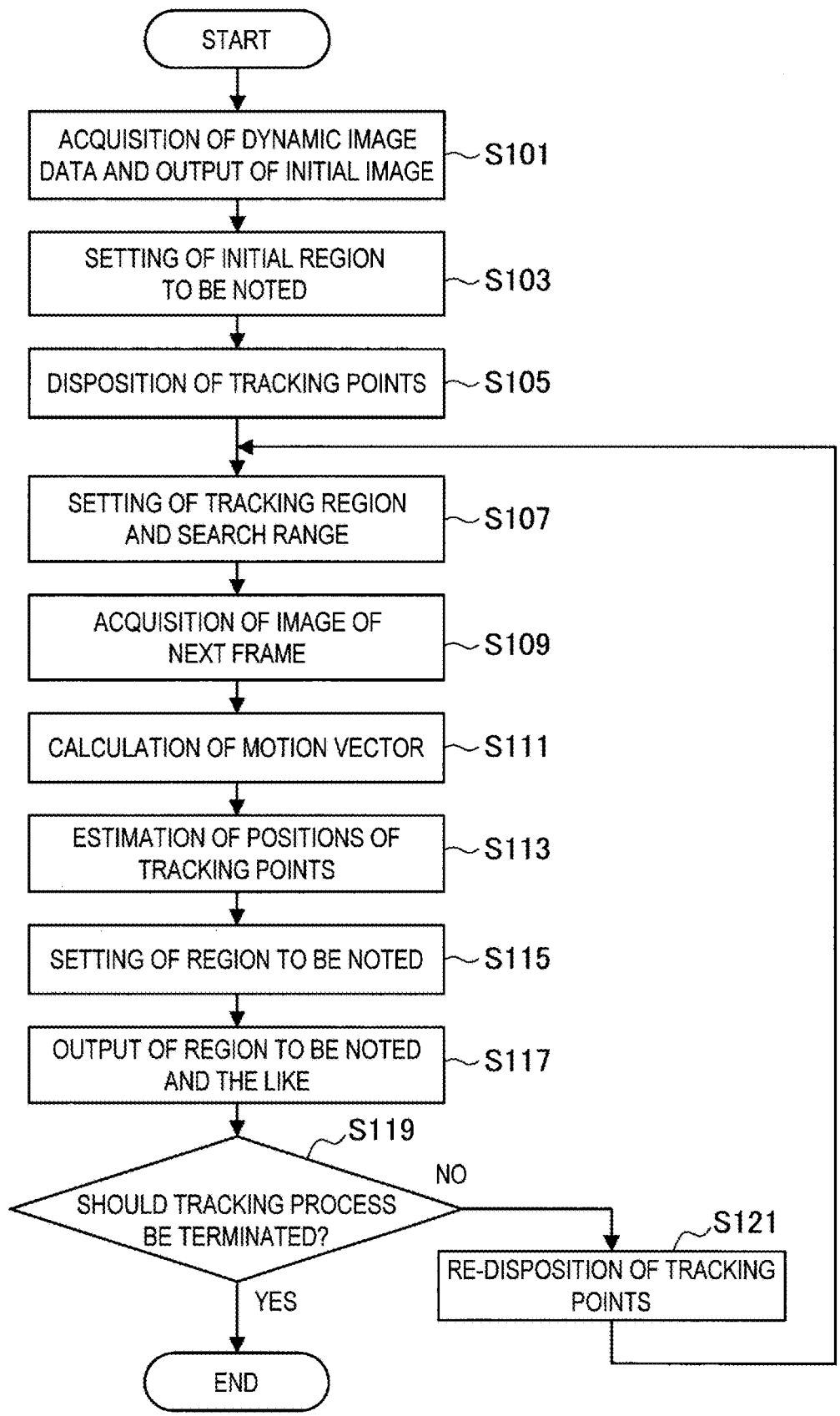

[Fig. 4]
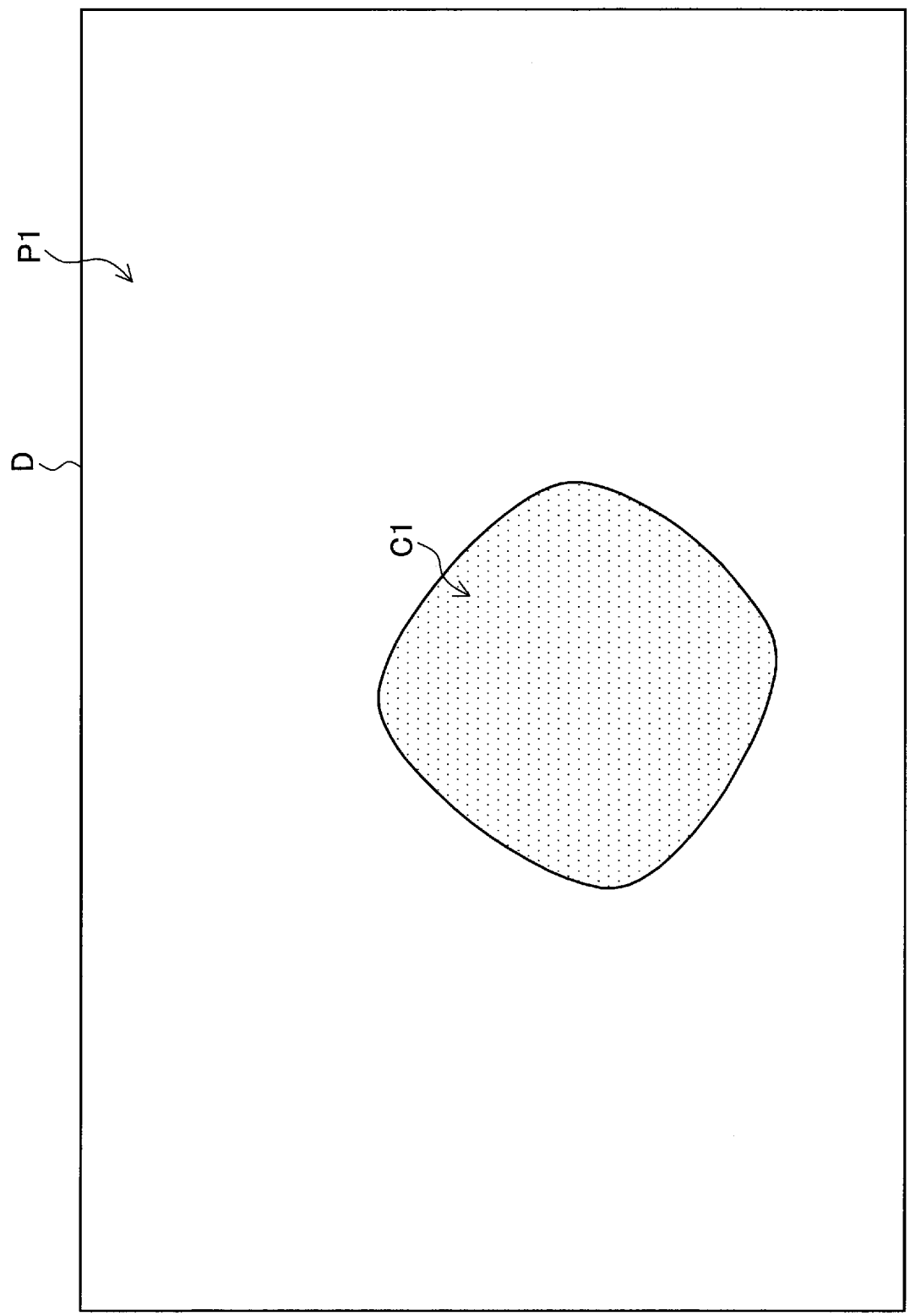

[Fig. 5]
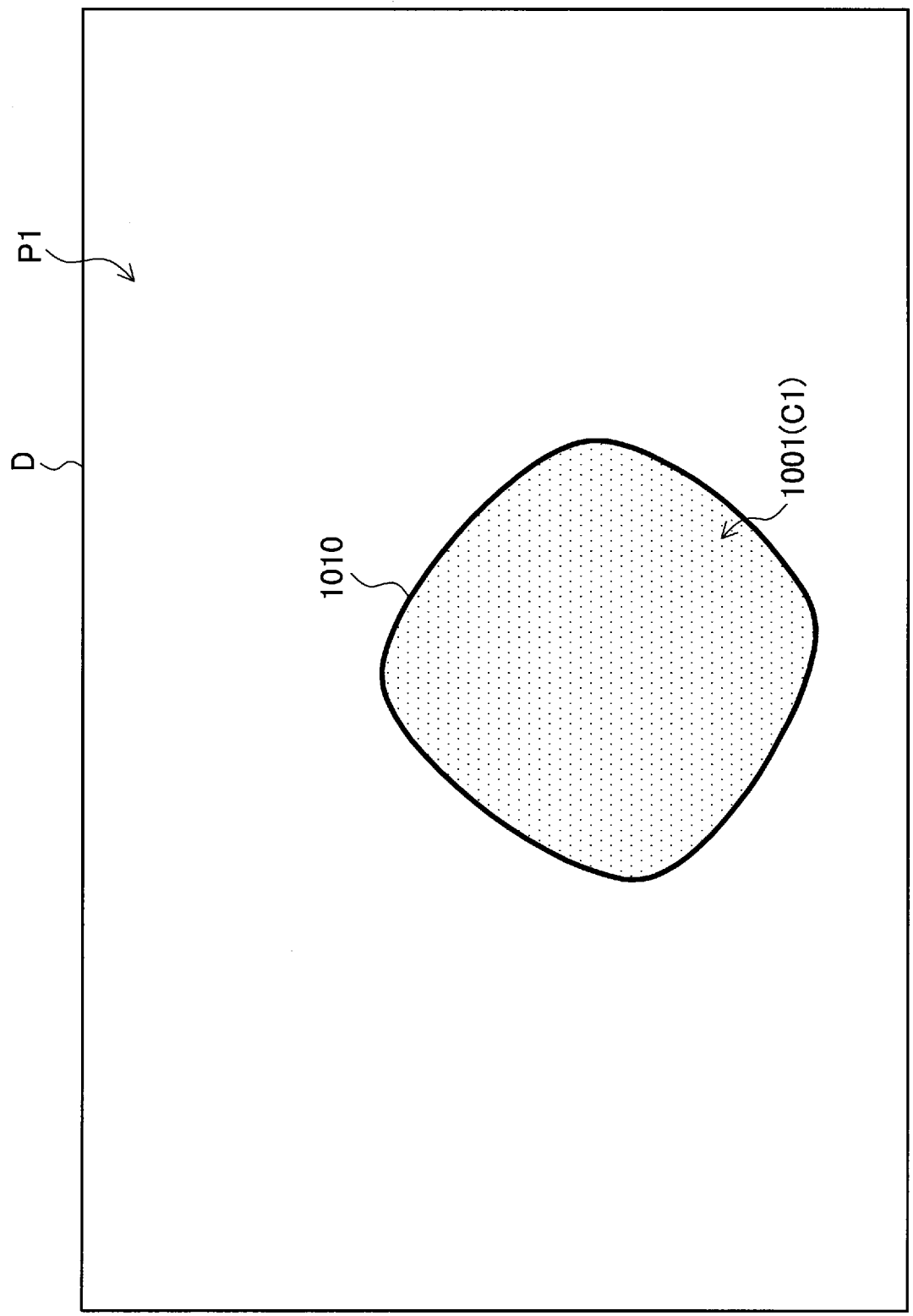

[Fig. 6]
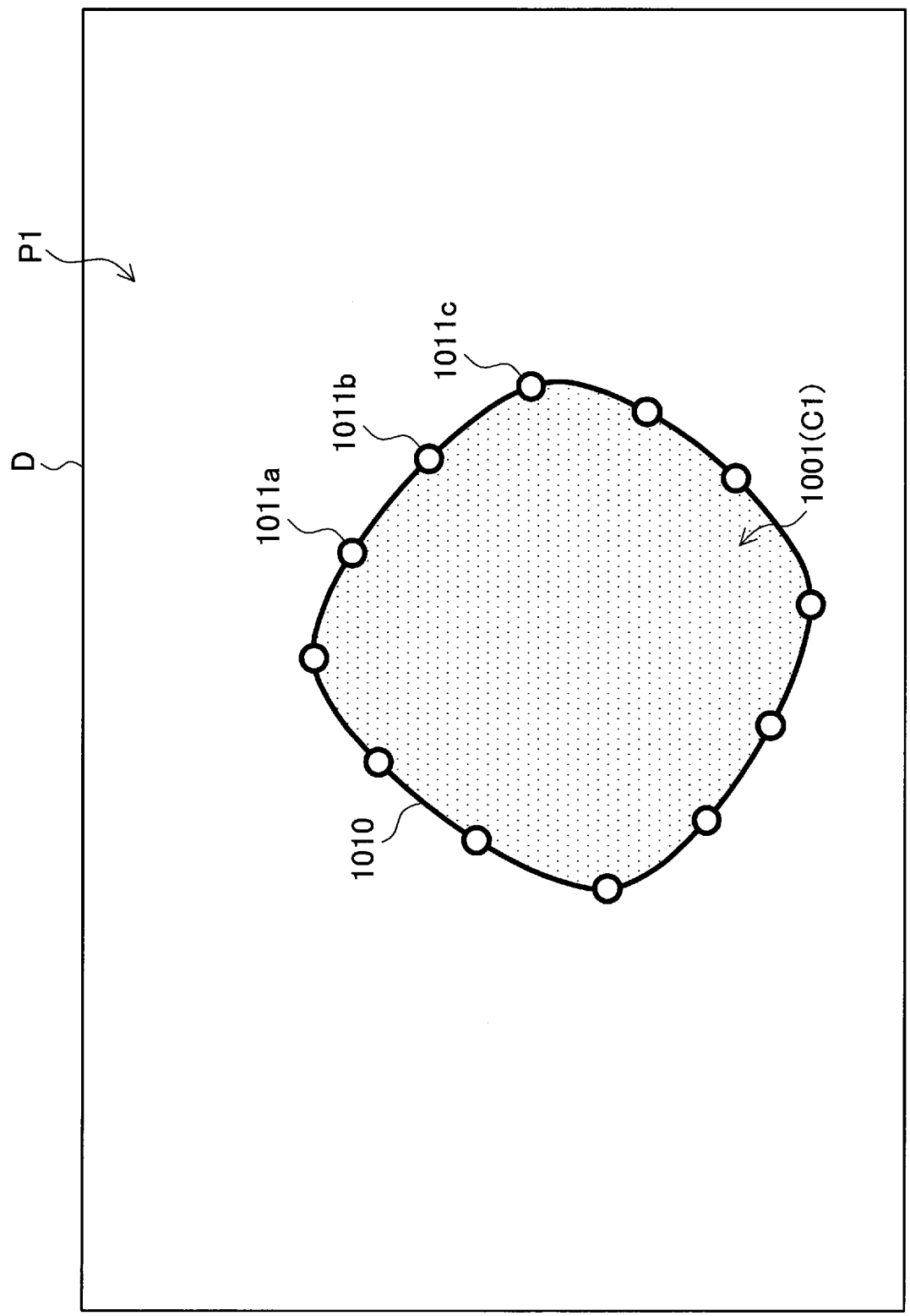

[Fig. 7]
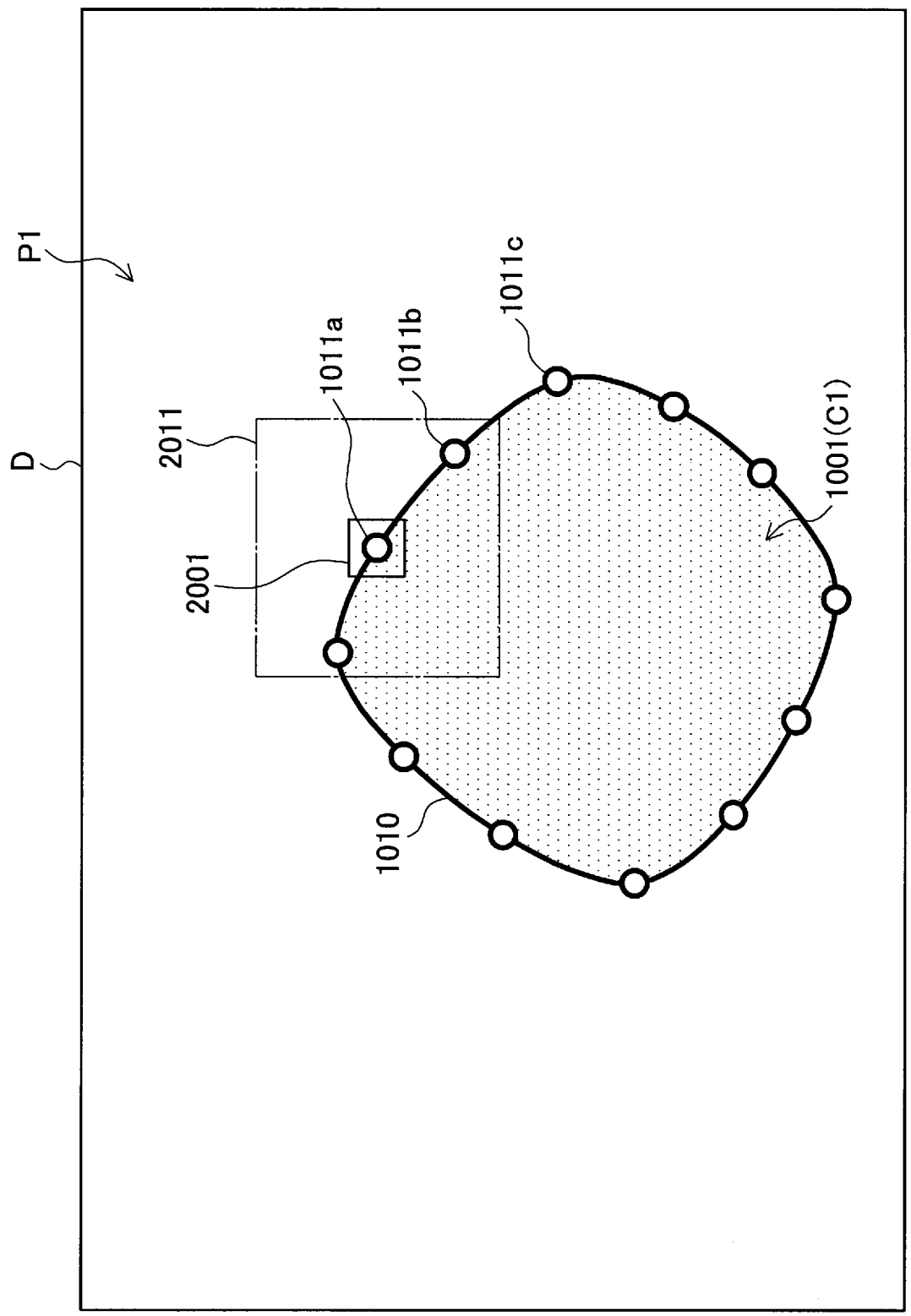

[Fig. 8]
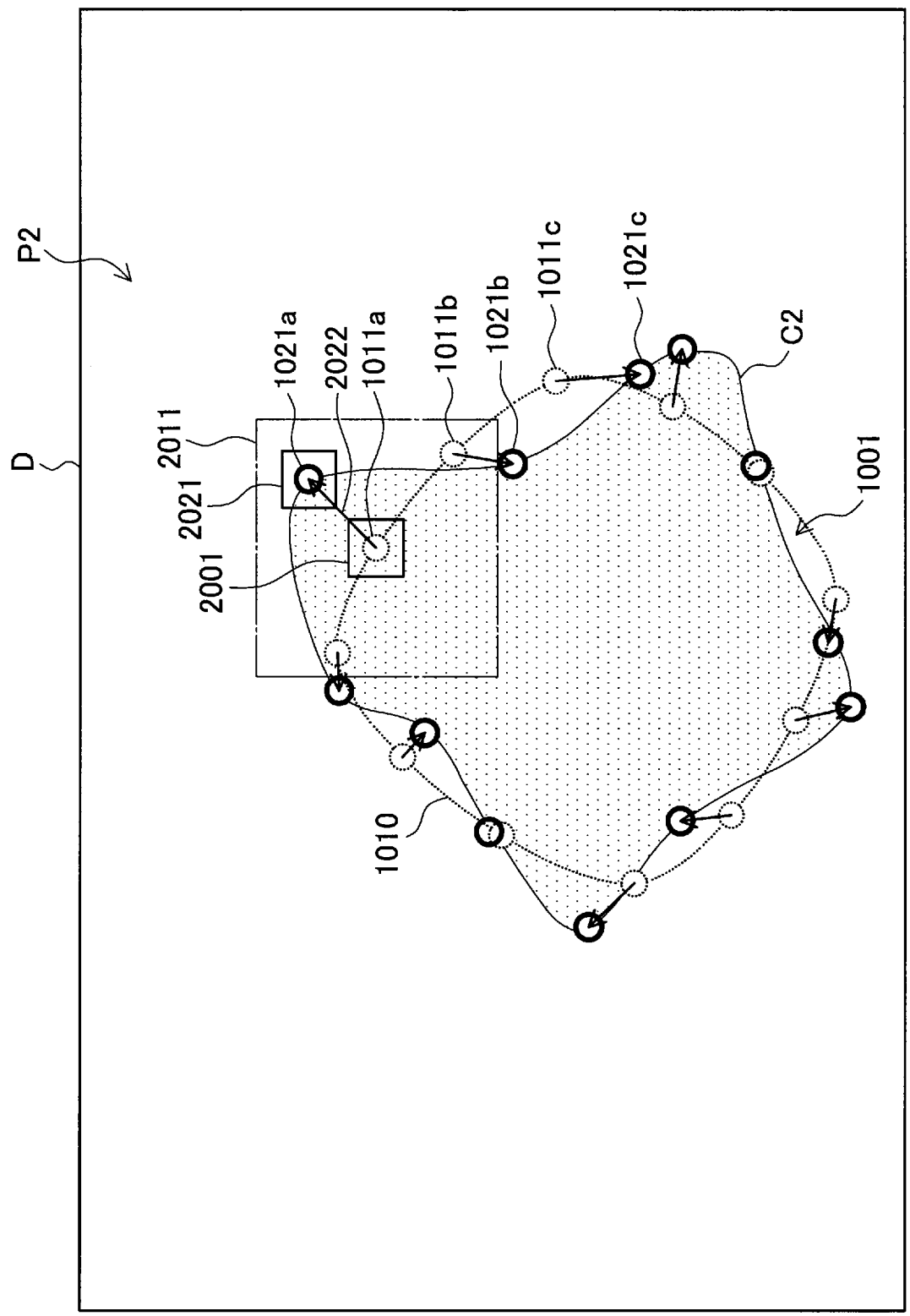

[Fig. 9]
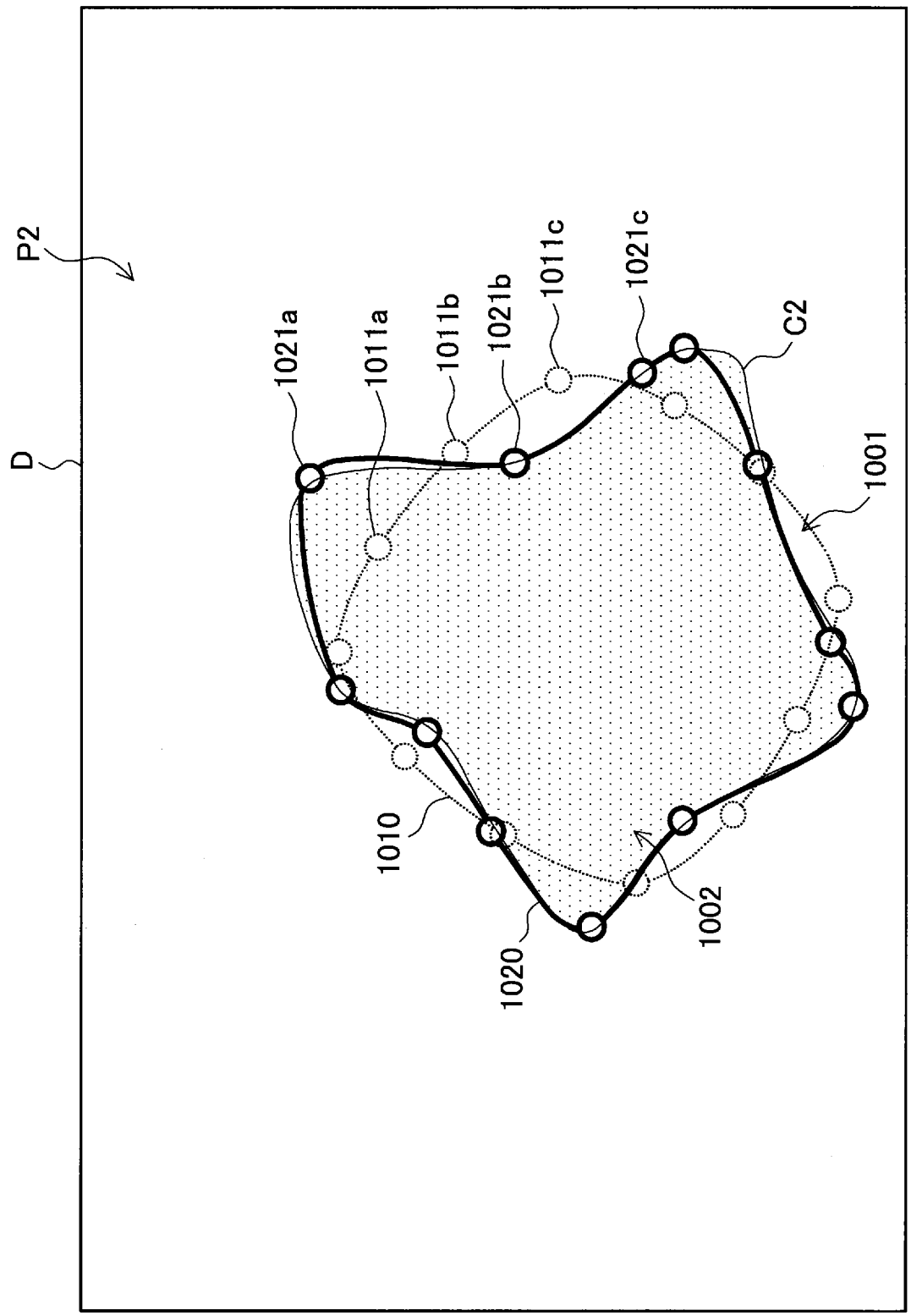

[Fig. 10]
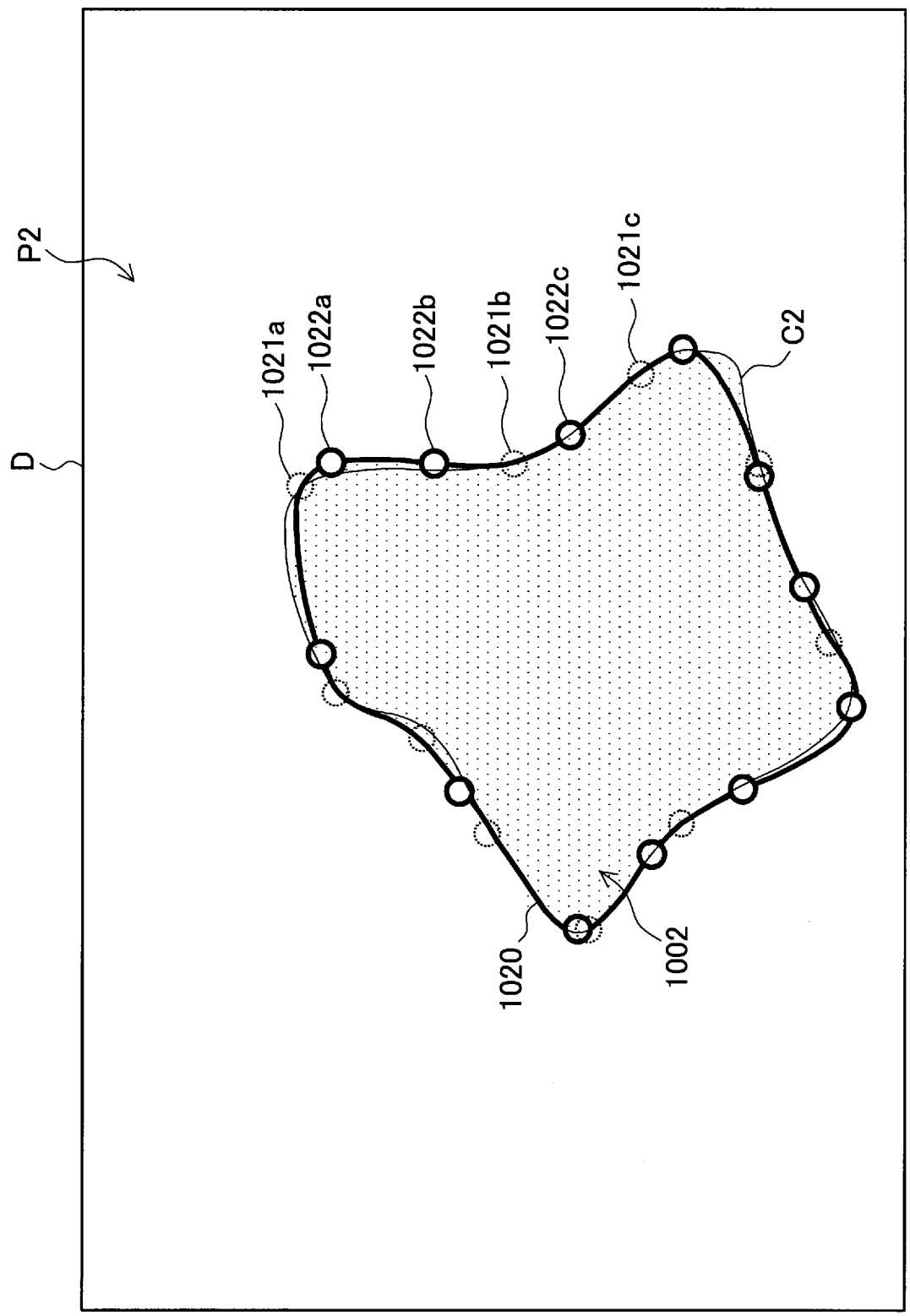

[Fig. 11]
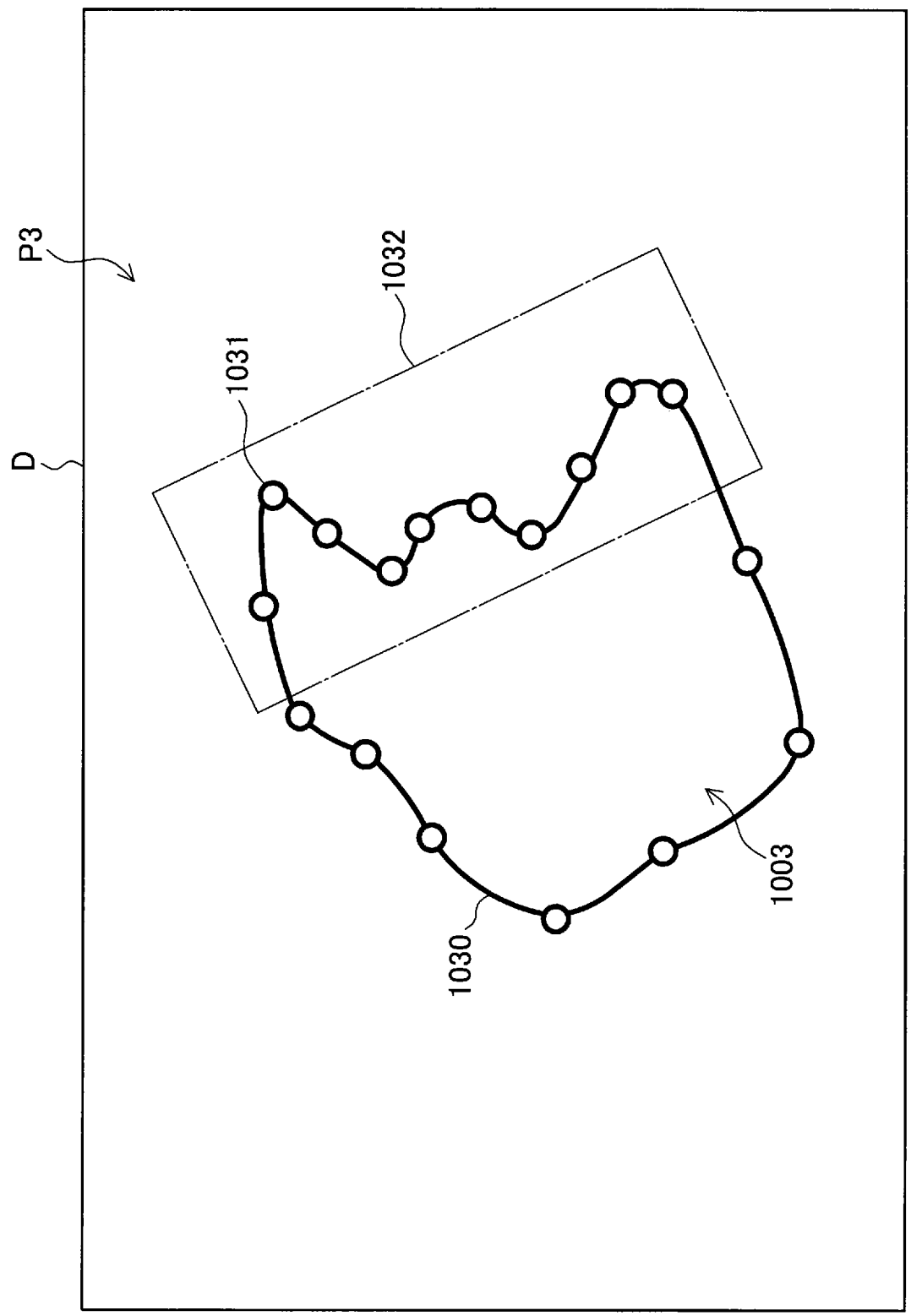

[Fig. 12]
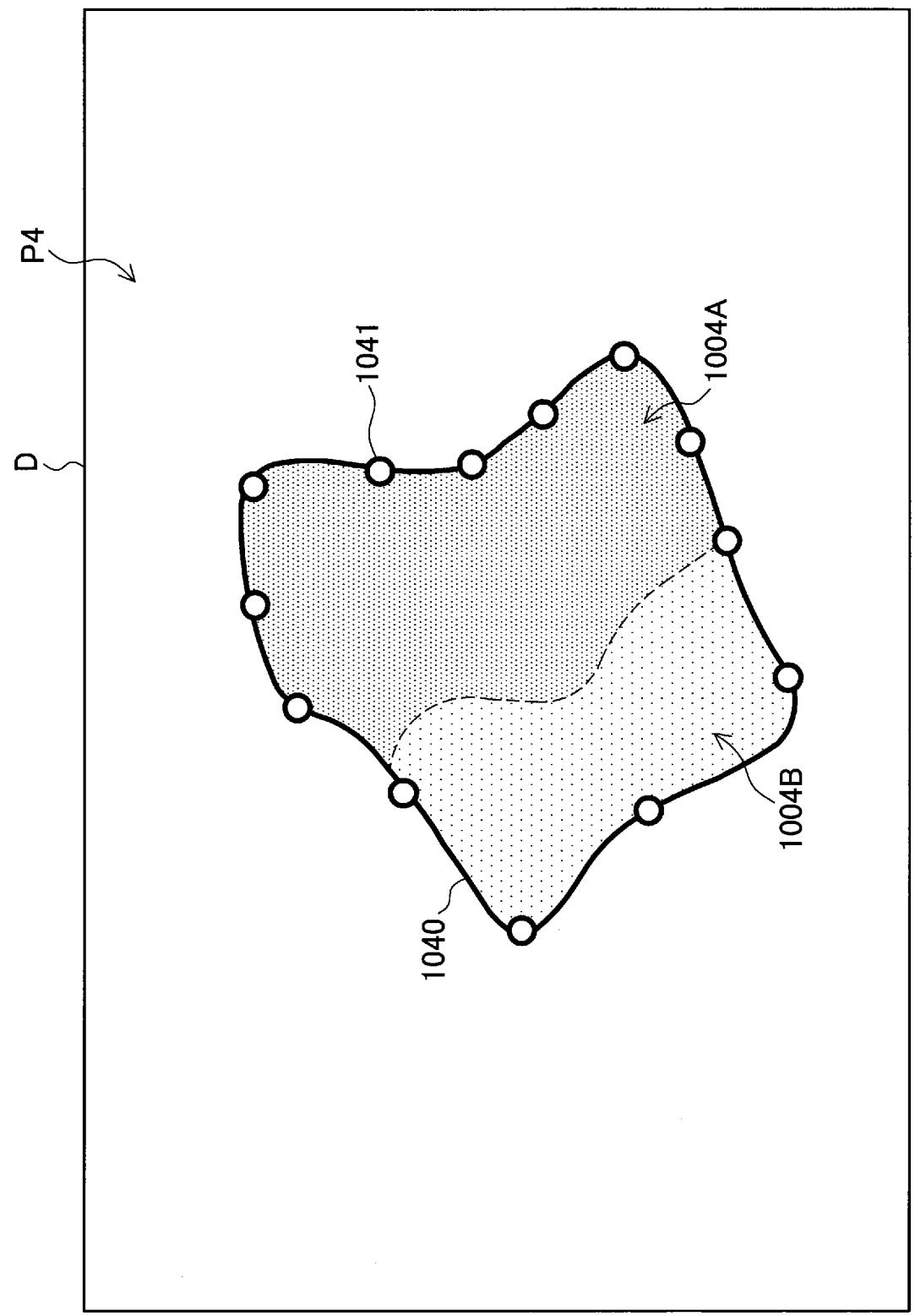

[Fig. 13]
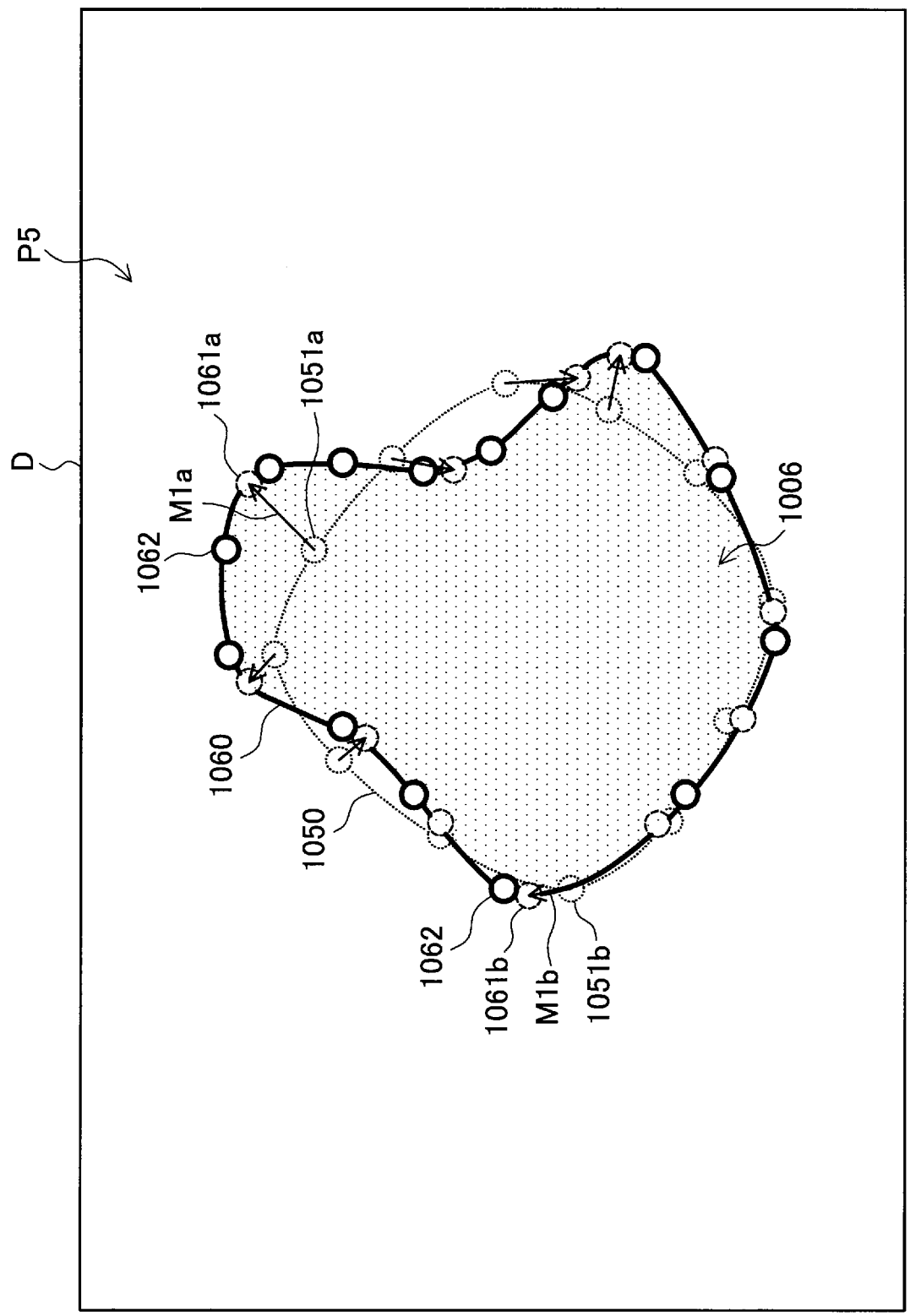

[Fig. 14]
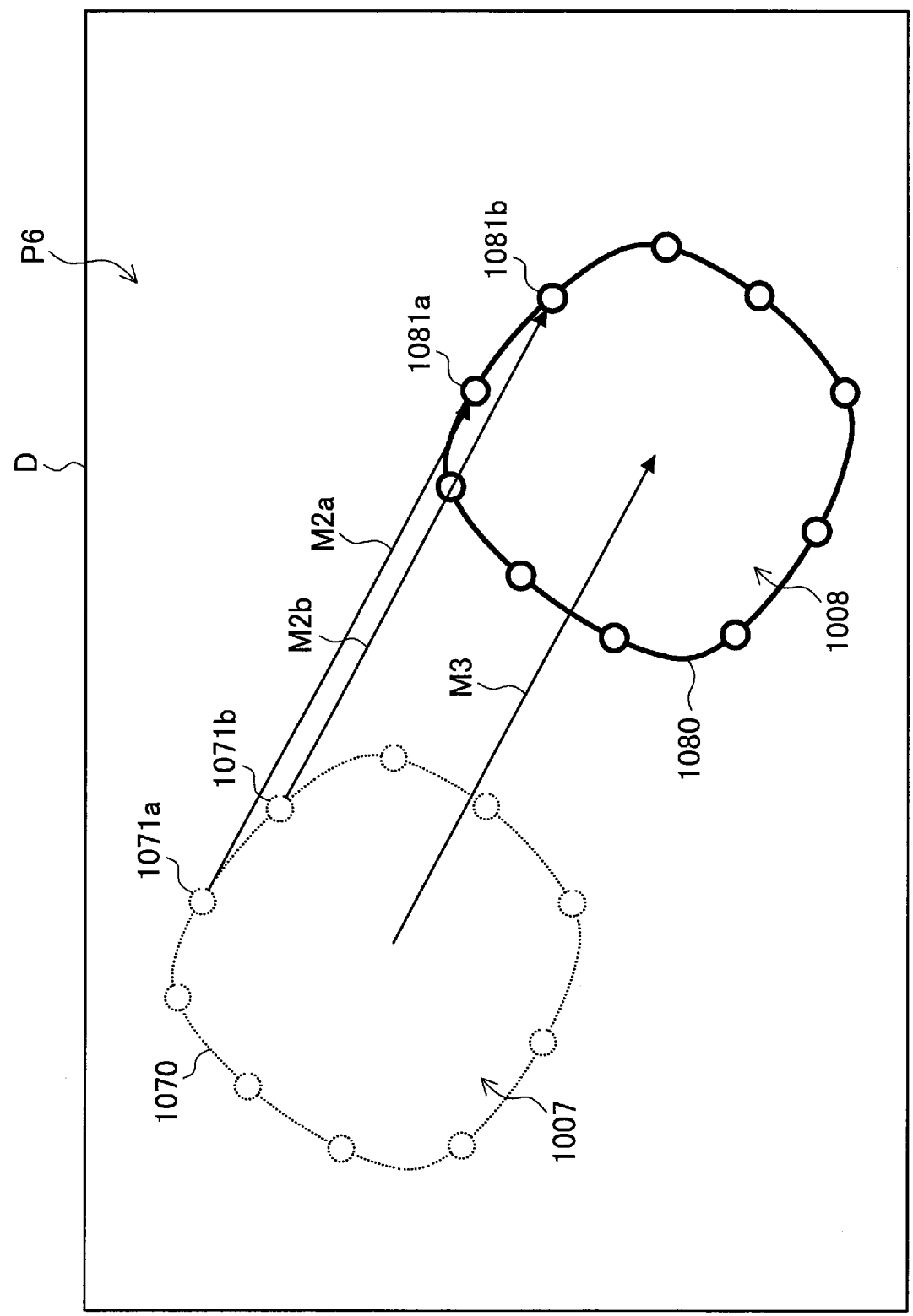

[Fig. 15]
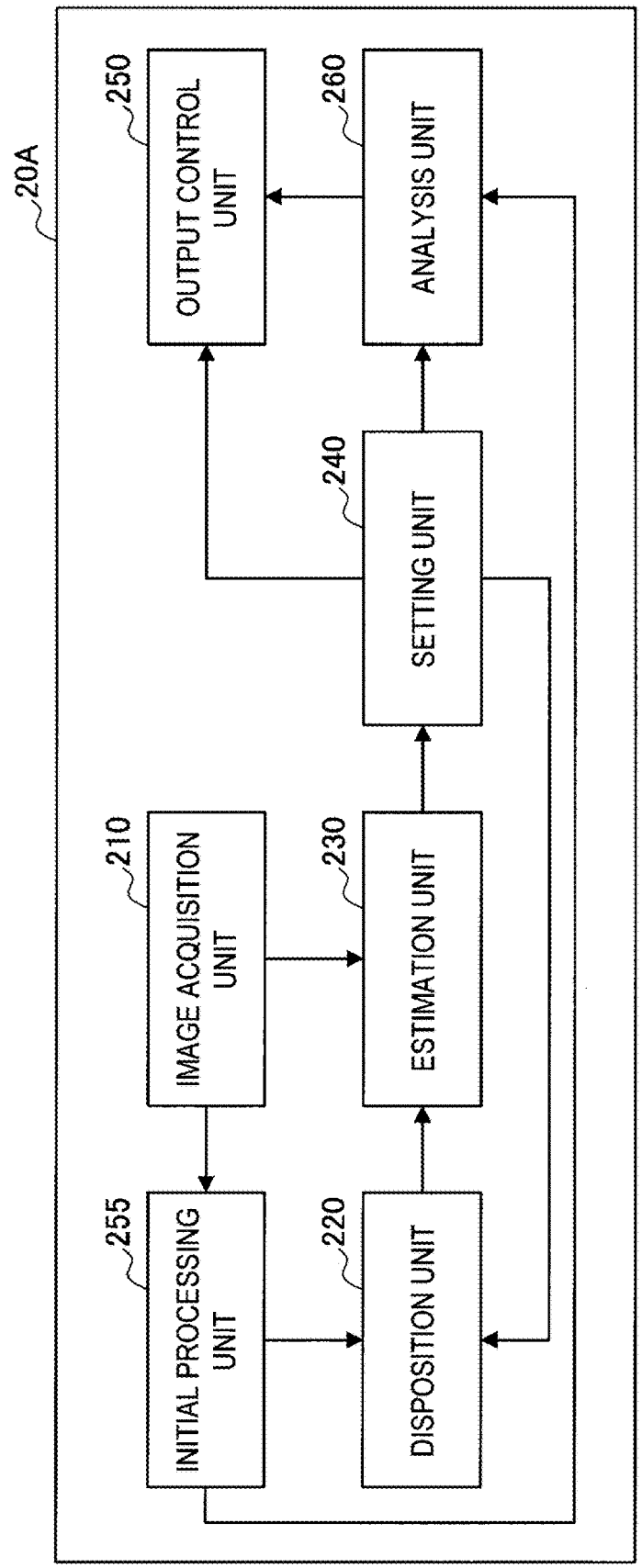

[Fig. 16]
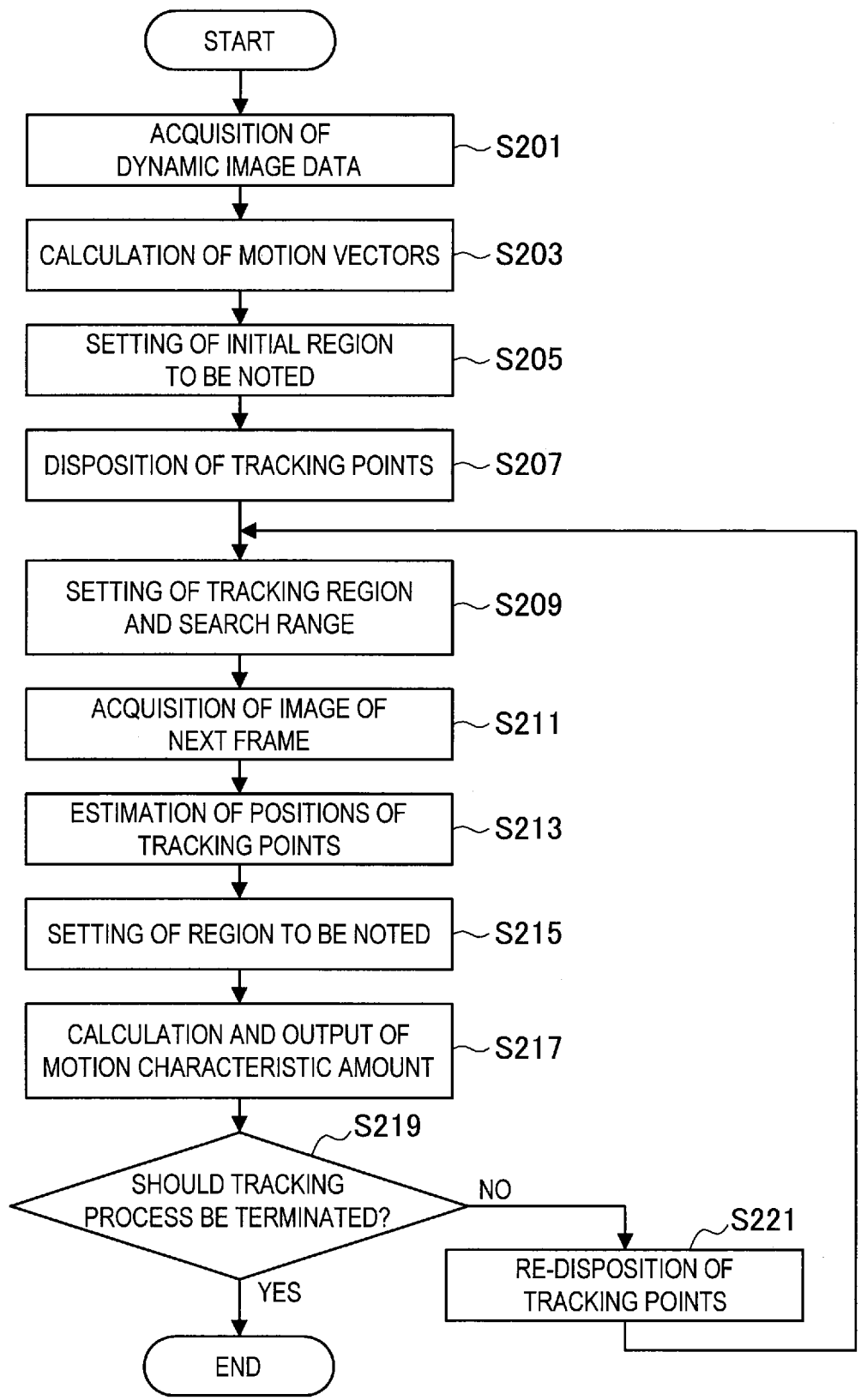

[Fig. 17]
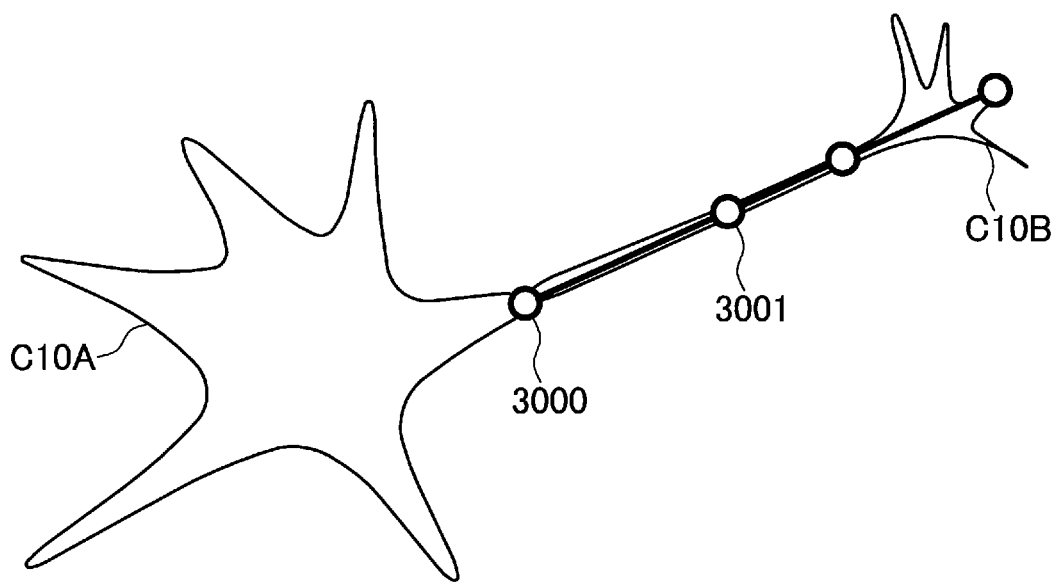
[Fig. 18]
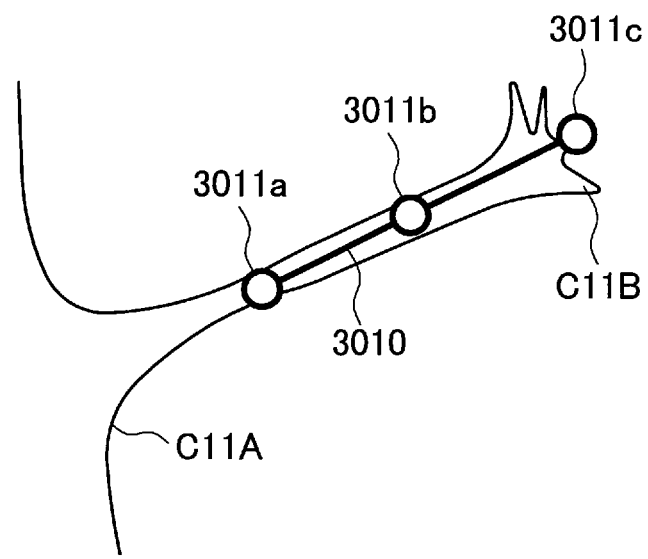

[Fig. 19]
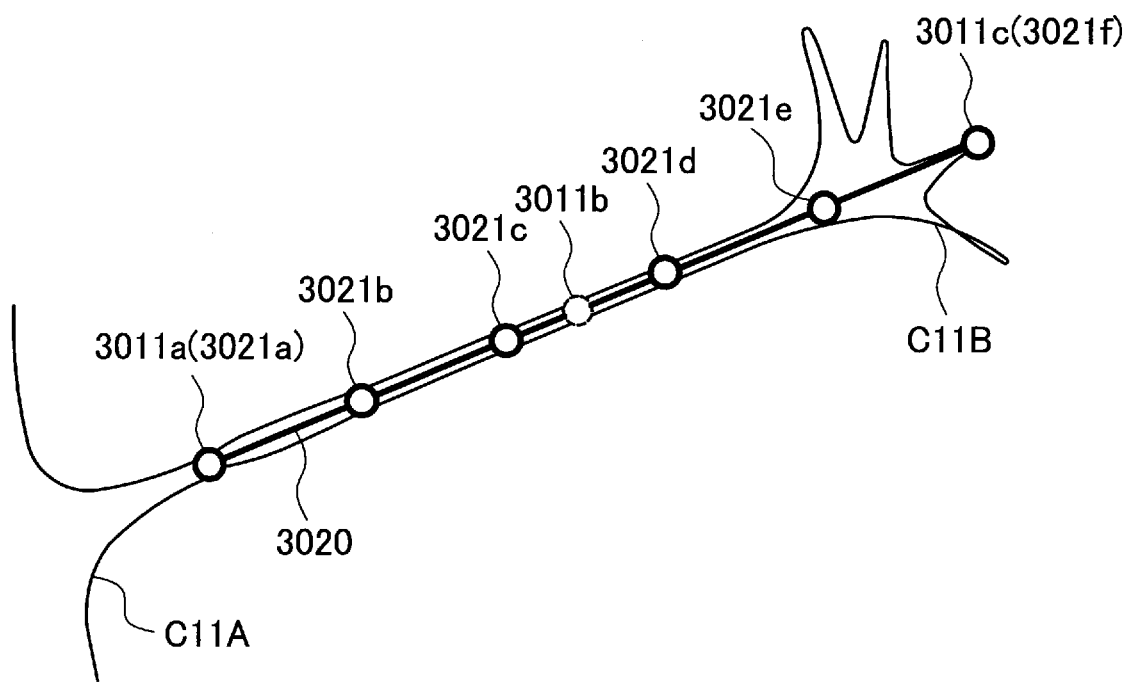

[Fig. 20]
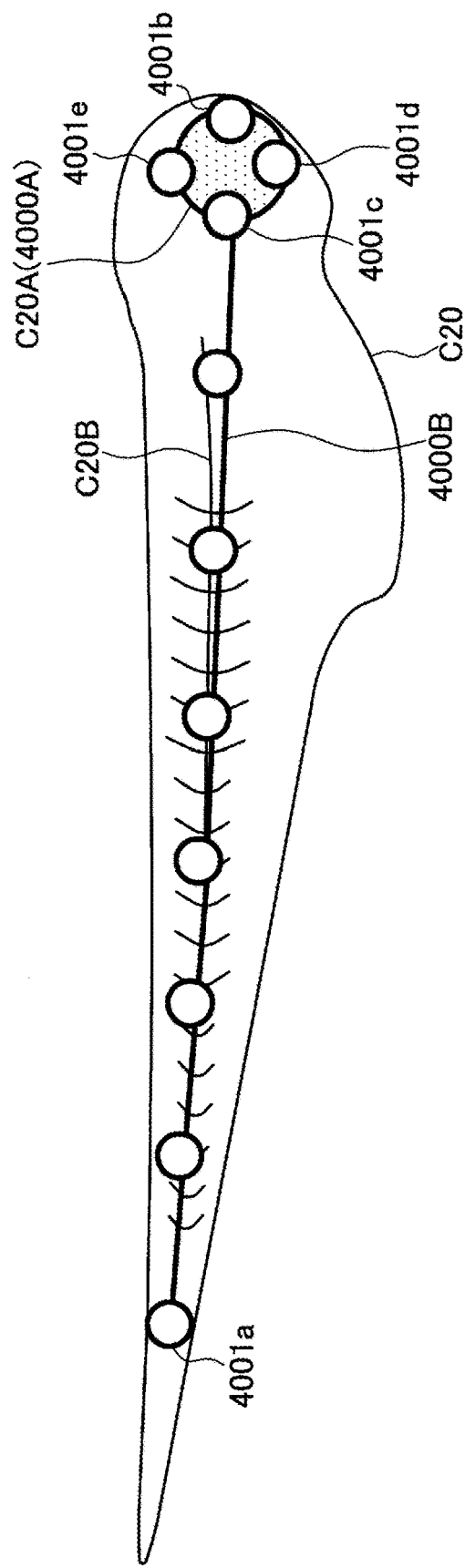

[Fig. 21]
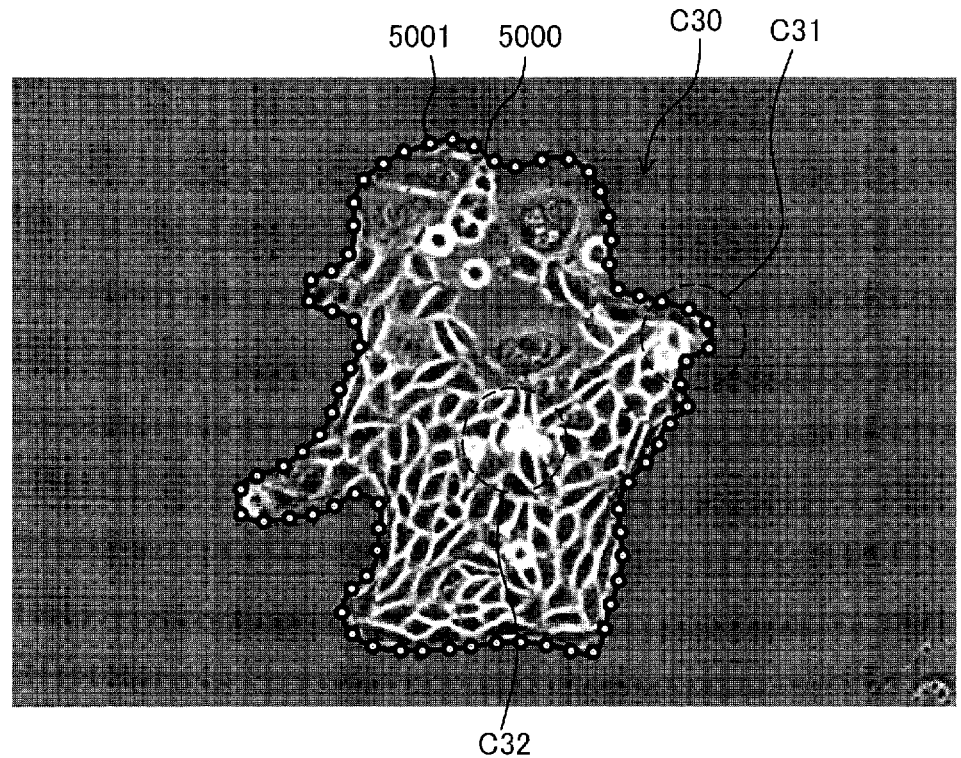
[Fig. 22]
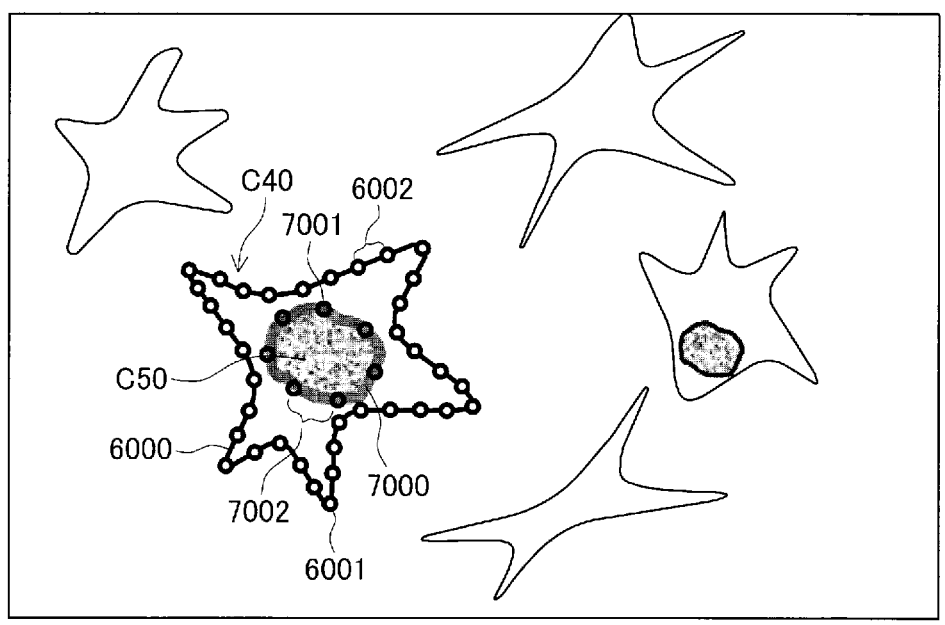

[Fig. 23]
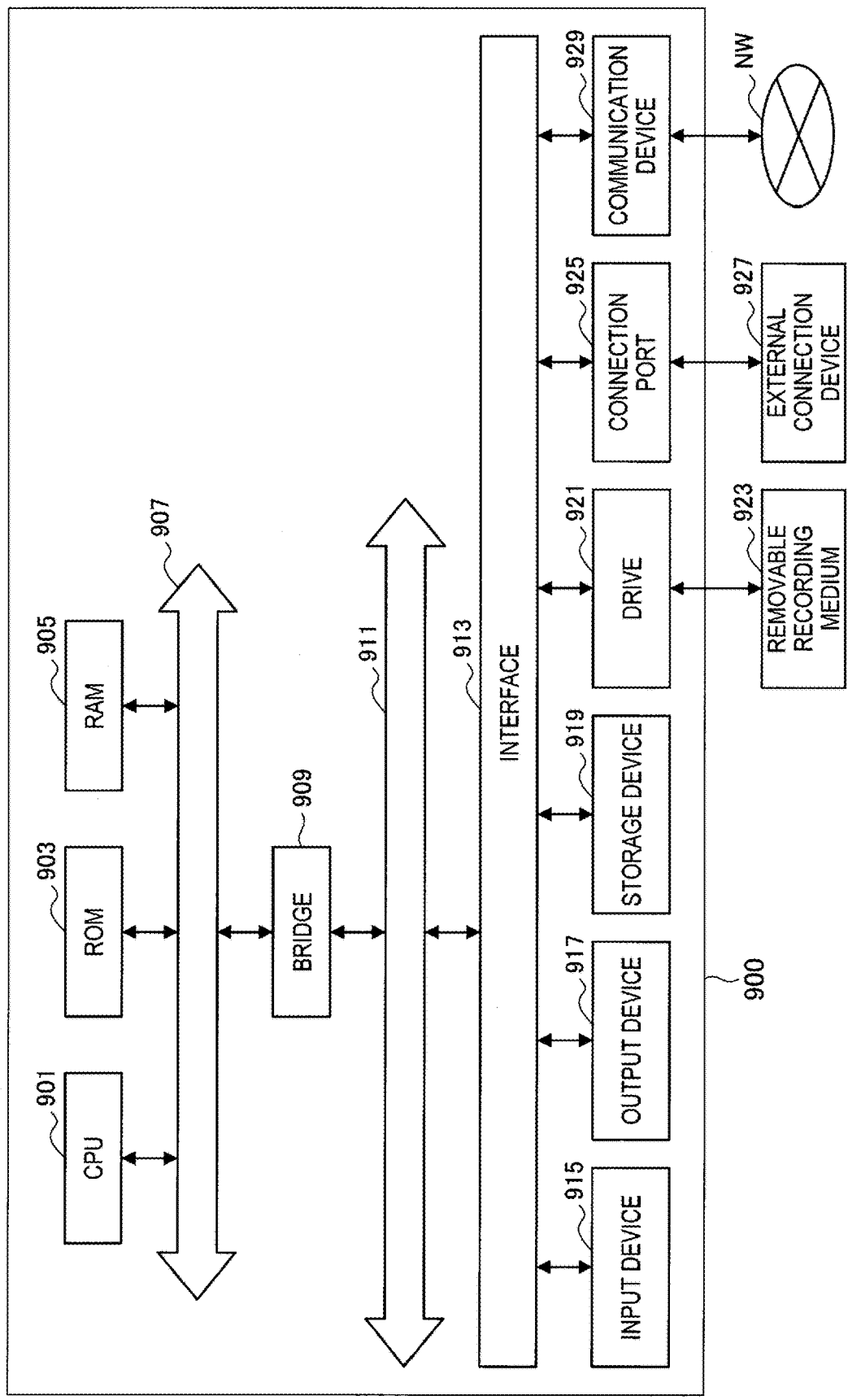

SYSTEM AND METHODS FOR TRACKING MOTION OF BIOLOGICAL CELLS

CROSS REFERENCE TO RELATED APPLICATIONS

This application is a national stage entry filed under 35 U.S.C. § 371 of PCT Application Serial No. PCT/JP2016/004345, filed on Sep. 26, 2016. PCT Application Serial No. PCT/JP2016/004345 claims priority to Japanese Priority Patent Application JP 2015-199991 filed Oct. 8, 2015, and Japanese Priority Patent Application JP 2016-150604 filed Jul. 29, 2016, the entire contents of each of which are incorporated herein by reference.

TECHNICAL FIELD

The present disclosure relates to an information processing device, an information processing method, and an information processing system.

BACKGROUND ART

In the fields of medicine and life science, motions or changes of states of various kinds of biological tissues have been observed. In order to track such motions or changes of states of biological tissues, technologies for tracking a region corresponding to a biological tissue or the like in a captured image using image processing have been developed.

For example, PTL 1 mentioned below discloses a technology in which a biological tissue such as an organ is set as an observation target, and then tracking points are disposed for a partial region of the observation target in an image obtained using ultrasonic waves or computed tomography (CT) to track movements of the tracking points. In this technology, since the movements of the tracking points are calculated, motions of the biological tissue that is an observation target can be quantitatively evaluated.

CITATION LIST

Patent Literature

PTL 1: JP 5508035B

SUMMARY

Technical Problem

However, if an observation target is a cell rather than a biological tissue such as an organ, growth, motions, and the like of the cell cause its shape to change significantly in a short period of time. For this reason, if motions of the tracking points disposed once are merely tracked in the technology disclosed in PTL 1 mentioned above, it is difficult to track changes in the shape of portions in which no tracking points are disposed.

Therefore, the present disclosure proposes a novel and improved information processing device, information processing method, and information processing system which enable tracking of changes in the shape of an observation target with high accuracy.

Solution to Problem

According to an aspect of the present application, an information processing device is provided. The information processing device includes circuitry configured to dispose a plurality of tracking points within a first region of a first image and set a second region of a second image based on estimated positions of the plurality of tracking points in the second image. The estimated positions are determined by comparing the first image and the second image and the second image is captured at a different time point than the first image. The circuitry is further configured to re-dispose the plurality of tracking points within the second region of the second image.

According to an aspect of the present application, an information processing method is provided. The information processing method includes disposing a plurality of tracking points within a first region of a first image and setting a second region of a second image based on estimated positions of the plurality of tracking points in the second image. The estimated positions are determined by comparing the first image and the second image and the second image is captured at a different time point than the first image. The information processing method further includes re-disposing the plurality of tracking points within the second region of the second image.

According to an aspect of the present application, an information processing system is provided. The information processing system includes an imaging device configured to generate a plurality of images including a first image and a second image. The information processing system further includes circuitry configured to dispose a plurality of tracking points within a first region of a first image and set a second region of a second image based on estimated positions of the plurality of tracking points in the second image. The estimated positions are determined by comparing the first image and the second image and the second image is captured at a different time point than the first image. The circuitry is further configured to re-dispose the plurality of tracking points within the second region of the second image.

Advantageous Effects of Invention

According to embodiments of the present disclosure described above, it is possible to track changes in the shape of an observation target with high accuracy.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 1 is a diagram showing an overview of a configuration of an information processing system according to an embodiment of the present disclosure.

FIG. 2 is a block diagram showing a functional configuration example of the information processing device according to the embodiment.

FIG. 3 is a flowchart showing an example of a process performed by the information processing device according to the embodiment.

FIG. 4 is a diagram showing an example of display of a captured image in an initial setting process according to the embodiment.

FIG. 5 is a diagram showing an example of display of the captured image in the initial setting process and an initial region to be noted according to the embodiment.

FIG. 6 is a diagram showing an example of disposition of tracking points in the initial setting process according to the embodiment.

FIG. 7 is a diagram showing an example of setting of a tracking region and a search range in a tracking process according to the embodiment.

FIG. 8 is a diagram showing an example of calculation of motion vectors and an estimation example of tracking points in the tracking process according to the embodiment.

FIG. 9 is a diagram showing an example of setting of a region to be noted in the tracking process according to the embodiment.

FIG. 10 is a diagram showing an example of re-disposition of tracking points in the tracking process according to the embodiment.

FIG. 11 is a diagram for describing a first application example of a disposition process by a disposition unit according to the embodiment.

FIG. 12 is a diagram for describing a second application example of a disposition process by a disposition unit according to the embodiment.

FIG. 13 is a diagram for describing a third application example of a disposition process by a disposition unit according to the embodiment.

FIG. 14 is a diagram for describing an application example of an estimation process by an estimation unit according to the embodiment.

FIG. 15 is a block diagram showing a functional configuration example of an information processing device according to a modified example of the embodiment.

FIG. 16 is a flowchart showing an example of a process by the information processing device according to the modified example.

FIG. 17 is a diagram for describing a first application example of the information processing device (to a nerve cell) according to the embodiment.

FIG. 18 is a diagram showing an example of an initial setting process of an axon by the information processing device according to the embodiment.

FIG. 19 is a diagram showing an example of a tracking process of an axon by the information processing device according to the embodiment.

FIG. 20 is a diagram for describing a second application example of the information processing device (to a zebrafish) according to the embodiment.

FIG. 21 is a diagram for describing a third application example of the information processing device (to a colony) according to the embodiment.

FIG. 22 is a diagram for describing a fourth application example of the information processing device (to a macrophage and a foreign body) according to the embodiment.

FIG. 23 is a block diagram showing a hardware configuration example of an information processing device according to an embodiment of the present disclosure.

DESCRIPTION OF EMBODIMENTS

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Note that description will be provided in the following order.

1. Overview of information processing system
2. Information processing device
2.1. Configuration example
2.2. Process example
2.3. Effect
2.4. Process application example
2.5. Modified example
2.6. Device application example
3. Hardware configuration example
4. Conclusion

1. OVERVIEW OF INFORMATION PROCESSING SYSTEM

FIG. 1 is a diagram showing an overview of a configuration of an information processing system 1 according to an embodiment of the present disclosure. As shown in FIG. 1, the information processing system 1 is provided with an imaging device 10 and an information processing device 20. The imaging device 10 and the information processing device 20 are connected to each other via various types of wired or wireless networks.

(Imaging Device)

The imaging device 10 is a device which generates captured images (dynamic images). The imaging device 10 according to the present embodiment is realized by, for example, a digital camera. In addition, the imaging device 10 may be realized by any type of device having an imaging function, for example, a smartphone, a tablet, a game device, or a wearable device. The imaging device 10 images real spaces using various members, for example, an image sensor such as a charge coupled device (CCD) or a complementary metal oxide semiconductor (CMOS), a lens for controlling formation of a subject image in the image sensor, and the like. In addition, the imaging device 10 includes a communication device for transmitting and receiving captured images and the like to and from the information processing device 20. In the present embodiment, the imaging device 10 is provided above an imaging stage S to image a culture medium M in which a cell that is an observation target is cultured. In addition, the imaging device 10 generates dynamic image data by imaging the culture medium M at a specific frame rate. Note that the imaging device 10 may directly image the culture medium M (without involving another member), or may image the culture medium M via another member such as a microscope. In addition, although the frame rate is not particularly limited, it is desirable to set the frame rate according to the degree of a change of the observation target. Note that the imaging device 10 images a given imaging region including the culture medium M in order to accurately track a change of the observation target. Dynamic image data generated by the imaging device 10 is transmitted to the information processing device 20.

Note that, although the imaging device 10 is assumed to be a camera installed in an optical microscope or the like in the present embodiment, the present technology is not limited thereto. For example, the imaging device 10 may be an imaging device included in an electronic microscope using electron beams such as a scanning electron microscope (SEM) or a transmission electron microscope (TEM), or an imaging device included in a scanning probe microscope (SPM) that uses a probe such as an atomic force microscope (AFM) or a scanning tunneling microscope (STM). In this case, a captured image generated by the imaging device 10 is, for example, an image obtained by irradiating the observation target with electron beams in the case of an electronic microscope, and an image obtained by tracing the observation target using a probe in the case of an SPM. These captured images can also be analyzed by the information processing device 20 according to the present embodiment.

(Information Processing Device)

The information processing device 20 is a device having an image analyzing function. The information processing device 20 is realized by any type of device having an image analyzing function such as a personal computer (PC), a tablet, or a smartphone. In addition, the information processing device 20 may be realized by one or a plurality of information processing devices on a network. The information processing device 20 according to the present embodiment acquires a captured image from the imaging device 10 and executes tracking of a region of the observation target in the acquired captured image. The result of analysis of the tracking process performed by the information processing device 20 is output to a storage device or a display device provided inside or outside the information processing device 20. Note that a functional configuration that realizes each function of the information processing device 20 will be described below.

Note that, although the information processing system 1 is constituted with the imaging device 10 and the information processing device 20 in the present embodiment, the present technology is not limited thereto. For example, the imaging device 10 may perform a process related to the information processing device 20 (for example, a tracking process). In this case, the information processing system 1 is realized by the imaging device having the function of tracking an observation target.

Here, a cell set as an observation target undergoes various phenomena such as growth, division, combination, deformation, or necrosis in a short period of time, unlike a normal subject such as a human, an animal, a plant, or a non-living structure. In such a case, the shape of the cell can significantly change in a short period of time. For this reason, even if the shape of a cell that is an observation target in a captured image is tracked using the technology disclosed in JP 5508035B, for example, when the shape of a part in which no tracking points are disposed changes, it is not possible to track the change in the shape of that part. Thus, it is difficult to track the change in the shape of the cell with high accuracy. In addition, even if the observation target is an animal, a plant, or a non-living structure, when the observation target shows a remarkable change in its structure or shape of in a short period of time, for example, growth of a thin film or nano-cluster crystal, it is difficult to keep tracking the observation target with high accuracy using the technology disclosed in the patent literature.

Therefore, according to the information processing system 1 of the present embodiment, a plurality of tracking points are disposed for a region to be noted set in a captured image, positions of tracking points in another captured image that is captured at a different time point are estimated, the region to be noted is re-set based on the tracking points at the estimated positions, and further tracking points are re-disposed for the re-set region to be noted. When a region of a cell that is an observation target is to be tracked, this technology makes it possible to re-dispose tracking points for tracking a change of the region at proper positions in each captured frame. Accordingly, positions of the tracking points can be properly adjusted following the change in the shape of the cell, and thus it is possible to track the change in the shape of the cell with high accuracy, regardless of the degree of the change in the shape of the cell.

The overview of the information processing system 1 according to an embodiment of the present disclosure has been described above. The information processing device 20 included in the information processing system 1 according to an embodiment of the present disclosure is realized in the following embodiment. A specific configuration example and an operation process of the information processing device 20 will be described below.

2. INFORMATION PROCESSING DEVICE

First, the information processing device 20 according to a first embodiment of the present disclosure will be described with reference to FIGS. 2 to 22.

(2.1. Configuration Example)

FIG. 2 is a block diagram showing a functional configuration example of the information processing device 20 according to an embodiment of the present disclosure. As shown in FIG. 2, the information processing device 20 includes an image acquisition unit 210, an initial setting unit 215, a disposition unit 220, an estimation unit 230, a setting unit 240, and an output control unit 250.

(Image Acquisition Unit)

The image acquisition unit 210 acquires captured image data generated by the imaging device 10 via a communication device that is not illustrated. For example, the image acquisition unit 210 acquires dynamic image data generated by the imaging device 10 in a time series manner.

Note that images that the image acquisition unit 210 acquires include an RGB image, a grayscale image, or the like. When an acquired image is an RGB image, the image acquisition unit 210 converts the captured image that is the RGB image into a grayscale image.

In addition, the image acquisition unit 210 outputs the acquired captured image data to the initial setting unit 215 or the estimation unit 230. For example, when a tracking process to be performed by the information processing device 20 has not started, the image acquisition unit 210 outputs one piece of image data of the acquired captured image data to the initial setting unit 215 for an initial setting of a region to be noted by the initial setting unit 215 to be described below. On the other hand, when a tracking process is being executed by the information processing device 20, the image acquisition unit 210 outputs captured image data out of the acquired captured image data, which is different from captured image data used in a tracking process executed one time before for estimation by the estimation unit 230.

Note that, although a tracking process mentioned in the present specification will be described in detail, the process means a series of processes performed by the disposition unit 220, the estimation unit 230, and the setting unit 240 as shown in FIG. 2. This tracking process can be repetitively executed on captured image data included in dynamic image data acquired by the image acquisition unit 210.

(Initial Setting Unit)

The initial setting unit 215 has a function of performing an initial setting of a region to be noted for the captured image acquired from the image acquisition unit 210 when a tracking process by the information processing device 20 has not started.

Note that a region to be noted mentioned in the present specification means a region that is subject to a tracking process within a captured image. In the present embodiment, the region to be noted is a region corresponding to an observation target of a captured cell or the like. That is, in a series of tracking processes, a region to be noted set by the setting unit 240 to be described below is a tracking result of a region that corresponds to an observation target. Note that a region to be noted set by the initial setting unit 215 may not completely coincide with a region that corresponds to an observation target within a captured image. However, in order to track a region that corresponds to an observation target with high accuracy, it is desirable to properly set a region to be noted.

In addition, the region to be noted in the present specification may be a region expressed using, for example, an open curve (including a straight line), or may be a region surrounded by a closed curve (a curve whose starting point and ending point match). In addition, a plurality of closed regions or a region in the shape of 8 may be set through an operation of a user.

A region to be noted may be set through an operation of the initial setting unit 215 by a user. For example, a region to be noted may be set by a user operating an input device such as a mouse, a touch pen, or a touch panel that is not illustrated to trace the outer circumference of an observation target (for example, the contour of a cell) within a captured image displayed on a display device (such as a display) that is not illustrated. Accordingly, a region that the user desires can be set as a region to be noted.

In addition, even when an open curve is expressed through an operation of a user, the initial setting unit 215 may set a region to be noted as a region surrounded by a closed curve through an interpolation process or the like. In addition, a region to be noted may be automatically set by the initial setting unit 215 through an image analysis process. For example, the initial setting unit 215 may set a region to be noted using an image analysis technique such as a binary image transform, a Hough transform, or machine learning. Accordingly, a burden of a user caused by an initial setting of a region to be noted can be reduced.

Information with regard to the region to be noted set by the initial setting unit 215 is output to the disposition unit 220.

(Disposition Unit)

The disposition unit 220 has a function of disposing a plurality of tracking points for the region to be noted.

Here, a tracking point mentioned in the present specification is a point disposed to correspond to a region to be noted set in a given captured image. In the present embodiment, for example, tracking points are disposed on a line or a contour defining a region to be noted with predetermined intervals. The estimation unit 230 to be described below estimates positions of the tracking points in another captured image captured at a different time point from the captured image used when the region to be noted is set. By estimating the positions of these tracking points in a time series manner, a change in the shape of a cell can be tracked.

Note that, when the region to be noted is expressed with an open curve, the disposition unit 220 disposes tracking points at the respective terminal points of the open curve. On the other hand, when the region to be noted is expressed with a closed curve, the disposition unit 220 may not dispose a tracking point at a specific position on the closed curve. However, when the region to be noted is set using a closed curve through an operation of the user, the disposition unit 220 may dispose a tracking point at the starting point (or the ending point) of the closed curve. Therefore, the tracking points can be disposed at the position that the user desires.

The number of tracking points disposed and disposition intervals between them may be decided according to the type of observation target, or the shape of the observation target. For example, when the shape of a cell that is an observation target significantly changes, it is desirable to increase the number of tracking points disposed and decrease the disposition intervals. Accordingly, even when the shape of the cell significantly changes, the change in the shape can be tracked with high accuracy. In addition, in order to reduce a burden of calculation, it is desirable to reduce the number of tracking points disposed and increase the disposition intervals.

When a tracking process by the information processing device 20 has not started, the disposition unit 220 according to the present embodiment disposes tracking points for the region to be noted set by the initial setting unit 215.

On the other hand, when a tracking process has been executed by the information processing device 20, the disposition unit 220 re-disposes the tracking points with regard to the region to be noted set by the setting unit 240. Accordingly, a tracking point can be properly disposed for each tracking process. For example, when the tracking points are not re-disposed, it is not possible to track a change in the shape of a part of the cell that is an observation target in which no tracking points are disposed. According to the present embodiment, the tracking points are re-disposed in each tracking process by the disposition unit 220 with proper intervals for the region to be noted set by the setting unit 240 one time before. Thus, even if the shape of the cell significantly changes, it is possible to confine a discrepancy between the region to be noted and a region corresponding to the cell at a minimum level. Therefore, the region corresponding to the cell can be tracked with high accuracy.

Note that the disposition unit 220 may re-dispose at least one tracking point among the tracking points previously disposed at the same position as that estimated by the estimation unit 230 to be described below. This is because, when the observation target included in a peripheral region of the tracking points disposed by the disposition unit 220 does not show a significant change in its features, for example, re-disposition of a tracking point at the same position improves accuracy in the tracking process.

Information with regard to the tracking point disposed (re-disposed) by the disposition unit 220 is output to the estimation unit 230 along with information of the captured image used in the setting of the region to be noted.

(Estimation Unit)

The estimation unit 230 has a function of estimating, based on comparison of the captured image used for setting the region to be noted (hereinafter referred to as a first captured image) to another captured image acquired from the image acquisition unit 210 (hereinafter referred to as a second captured image), positions of the tracking points of the region to be noted disposed in a first captured image in a second captured image. Here, the second captured image refers to a captured image of which a capturing time point is different from that of the first captured image. The second captured image may be, for example, a captured image of any frame among a few frames before and after the frame of the first captured image. To be more specific, the second captured image may be a captured image generated one frame after the first captured image. In addition, as will be described in detail, the capturing time point of the second captured image (the number of frames between the first captured image and the second captured image) that is an estimation target may be designated according to a state, a change, or the like of the observation target.

The estimation unit 230 may estimate positions of the tracking points based on, for example, a motion vector calculated by comparing the first captured image to the second captured image. This motion vector may be a motion vector calculated for each tracking point. The motion vector may be calculated using a technique such as block matching, or a gradient method. In the present specification, the estimation unit 230 is described as estimating the motion vector using block matching.

For example, with regard to a tracking region in a predetermined size including tracking points, the estimation unit 230 may estimate positions of the tracking points in the second captured image by detecting a region of which information of pixels included in the tracking region of the first captured image matches that of the second captured image from a predetermined search range of the second captured image. In this case, a size of the tracking region and the search range may be decided according to an imaging condition (for example, an imaging magnification) of the imaging device 10, the type of the observation target, the type of analysis performed on the observation target. When a movement of the observation target is large, for example, the tracking region or the search range may be set to be larger. Accordingly, accuracy in estimation of tracking points by the estimation unit 230 can be enhanced. In addition, when there are a number of tracking points for a region to be noted, the tracking region or the search range may be adjusted to be small in order to reduce a load of calculation.

In addition, the estimation unit 230 may estimate a position of a tracking point in the second captured image generated at an imaging time point decided based on information of the observation target. When a change in the shape of a cell of which a speed of the change in the shape is slow is tracked, for example, a difference in captured images between a plurality of consecutive frames generated by the imaging device 10 is small. For this reason, when a change in the shape of a cell of which a speed of the change in the shape is slow is tracked, the estimation unit 230 may perform an estimation process with a captured image a number of frames before or after the frame of the first captured image as the second captured image. To be more specific, the estimation unit 230 may perform an estimation process with a captured image a number frames after the first captured image as the second captured image. The frame interval between the first captured image and the second captured image enables the data amount of the captured image that is subject to a tracking process to be reduced. Accordingly, it is possible to reduce a load of calculation and track a change in the shape of the cell over a long period of time. The frame interval can be appropriately set according to the type, a state, or the like of the cell.

The estimation unit 230 outputs information related to the estimated positions of the tracking points to the setting unit 240.

(Setting Unit)

The setting unit 240 has a function of setting a region to be noted in the second captured image based on the positions of the tracking points in the second captured image acquired from the estimation unit 230.

The setting unit 240 may set a region to be noted by, for example, performing interpolation on a closed curve (or an open curve when the original region to be noted is depicted using an open curve) that passes through the position of each tracking point estimated by the estimation unit 230. As a method of interpolating a closed curve, a known interpolation method, for example, Bezier curve interpolation, spline curve interpolation, or the like is used.

In addition, the setting unit 240 may set a region to be noted using an image analysis result of a captured image, in addition to the estimated positions of respective tracking points. For example, when the number of regions to be noted increases or decreases because the cell that is an observation target undergoes division or combination, it is difficult to set a region to be noted with high accuracy using only the positions of respective tracking points. Thus, the setting unit 240 can adjust an interpolation curve set based on each tracking point by performing image analysis on the captured image, for example, edge analysis or density analysis. More specifically, when the cell being observed divides, the setting unit 240 may detect the division of the cell through edge analysis or the like and set a region to be noted using the result of the detection. Accordingly, the number of regions to be noted and their positions can be appropriately set according to the division of the cell.

The setting unit 240 outputs information with regard to the set region to be noted to the disposition unit 220 and the output control unit 250. Note that, when a series of tracking processes ends, the setting unit 240 may not output the information to the disposition unit 220.

(Output Control Unit)

The output control unit 250 has a function of outputting various kinds of information obtained in the series of tracking processes, such as information of the region to be noted acquired from the setting unit 240. The output control unit 250 may output, for example, a result of disposition of the tracking points by the disposition unit 220, a result of estimation of the positions of the tracking points by the estimation unit 230, a result of setting of the region to be noted by the setting unit 240, or the like. An output aspect of the output control unit 250 is not particularly limited. For example, the output control unit 250 may display a captured image on a display device that is not illustrated, and overlap various kinds of information of tracking points or the region to be noted on the displayed captured image. In addition, the output control unit 250 may store the various kinds of information in a storage device that is not illustrated, or transmit such information to an external device using a communication device that is not illustrated.

(2.2. Process Example)

The configuration example of the information processing device 20 according to an embodiment of the present disclosure has been described above. Next, an example of a process performed by the information processing device 20 according to an embodiment of the present disclosure will be described with reference to FIGS. 3 to 10. Note that tracking points, a region to be noted, and the like obtained in the process according to the present embodiment will be described as being appropriately displayed on a display unit D of the display device by the output control unit 250.

FIG. 3 is a flowchart showing the example of the process performed by the information processing device 20 according to an embodiment of the present disclosure. The process according to the present embodiment is constituted of an initial setting process (Steps S101 to S105 of FIG. 3) and a tracking process (Steps S107 to S121 of FIG. 3).

(Initial Setting Process)

First, the image acquisition unit 210 acquires dynamic image data from the imaging device 10 and outputs one captured image out of the dynamic image data to the initial setting unit 215 (S101).

FIG. 4 is a diagram showing an example of display of a captured image in the initial setting process according to the present embodiment. As shown in FIG. 4, the captured image P1 is displayed on the display unit D, and a cell image C1 is included in the captured image P1.

Next, the initial setting unit 215 sets an initial region to be noted for the cell image C1 displayed in the captured image P1 (S103 of FIG. 3).

FIG. 5 is a diagram showing an example of display of the captured image in the initial setting process and the initial region to be noted according to the present embodiment. As shown in FIG. 5, the initial setting unit 215 draws a closed curve 1010 around the cell image C1, and sets the region surrounded by the closed curve 1010 as an initial region to be noted 1001. Note that, although the initial region to be noted 1001 is set by drawing the closed curve 1010 along the contour of the cell image C1 in the example shown in FIG. 5, the initial region to be noted 1001 may be set in a region inside or outside the cell image C1 or crossing the contour of the cell image C1. In addition, the closed curve 1010 may be drawn through an operation of a user via an input device that is not illustrated, or may be drawn based on an image analysis process for the captured image P1.

Next, the disposition unit 220 disposes tracking points for the initial region to be noted 1001 (S105 of FIG. 3).

FIG. 6 is a diagram showing an example of disposition of tracking points in the initial setting process according to the present embodiment. As shown in FIG. 6, the disposition unit 220 disposes a plurality of tracking points 1011 (1011a, 1011b, 1011c, - - - ) on the closed curve 1010 defining the initial region to be noted 1001. Note that, although the tracking points 1011 are disposed on the closed curve 1010 at substantially equal intervals in the example shown in FIG. 6, the disposition intervals between the tracking points are not particularly limited. A method of disposing tracking points will be described below. In addition, although the tracking points 1011 are disposed on the closed curve 1010 in the example shown in FIG. 6, positions at which the tracking points 1011 are disposed are not particularly limited as long as they are positions associated with the initial region to be noted 1001. However, since the region to be noted is set using a curve interpolating the tracking points in the setting process of the region to be noted by the setting unit 240, it is desirable to dispose the tracking points on the closed curve defining the initial region to be noted.

(Tracking Process)

The initial setting process performed by the information processing device 20 has been described above. Next, a tracking process performed by the information processing device 20 will be described.

When the initial setting process ends, the estimation unit 230 sets a tracking region around one tracking point 1011 and a search range of the tracking region (S107 of FIG. 3).

FIG. 7 is a diagram showing an example of setting of a tracking region and a search range thereof in a tracking process according to the present embodiment. As shown in FIG. 7, the estimation unit 230 sets a rectangular region around one tracking point 1011 as a tracking region 2001. A size of the tracking region 2001 is not particularly limited, and may be, for example, n pixels×n pixels (n=4, 8, 1, 32, or the like). In addition, a size of the tracking region 2001 may be decided according to an imaging condition of the imaging device 10, a type of observation target, or the like. Furthermore, the estimation unit 230 sets the search range 2011 in which the tracking region 2001 is searched. A size of the search range 2011, a center position of the search range 2011, and a shape of the search range 2011 are not particularly limited. A size of the search range 2011, for example, may be decided according to an imaging condition (for example, an imaging magnification) of the imaging device 10, a type of analysis performed on the observation target, or the like.

To describe with regard to FIG. 3 again, the estimation unit 230 next acquires another captured image that is different from the captured image used for setting the region to be noted from the image acquisition unit 210 (S109 of FIG. 3). Then, the estimation unit 230 calculates a motion vector of the tracking region corresponding to each tracking point (S111), and estimates the positions of the tracking points in the other captured image based on the calculated motion vector (S113).

FIG. 8 is a diagram showing an example of calculation of a motion vector and an example of estimation of positions of the tracking points in a tracking process according to the present embodiment. As shown in FIG. 8, the estimation unit 230 first acquires a captured image P2 that is the next frame of the captured image P1 in the present embodiment. The captured image P2 displays a cell image C2 of which the cell is the same as that shown in the captured image P1, and deformation of the cell can be ascertained therefrom. Note that, although FIG. 8 shows the initial region to be noted 1001 and the closed curve 1010 defining the initial region to be noted 1001, the display unit D does not display the initial region to be noted 1001 and the closed curve 1010 defining the initial region to be noted 1001 in practice.

Next, the estimation unit 230 calculates a motion vector of the tracking region corresponding to each tracking point. Referring to FIG. 8, for example, the estimation unit 230 searches the captured image P2 for a region that includes pixel information that most closely matches pixel information included in the tracking region 2001 corresponding to the tracking point 1011a of the captured image P1. Note that, in the example shown in FIG. 8, although the search range 2011 of the tracking region 2001 is set as a rectangular region around the tracking region 2001 (the tracking point 1011a), the search range may be the entire captured image P2.

When a region 2221 that includes the pixel information that most closely matches the pixel information included in the tracking region 2001 is specified, the estimation unit 230 calculates a motion vector 2022 based on the specified region 2221. The motion vector 2022 is computed using, for example, the block matching method. Then, the estimation unit 230 estimates the position of the respective tracking points 1011 in the captured image P2 based on the calculated motion vector 2022, and moves the tracking points 1011 to the estimated positions. For example, if the coordinates of each tracking point 1011 are set to (X(n), Y(n)) (n=1, 2, - - - , N), and the coordinates of the motion vector 2022 corresponding to each tracking point 1011 are set to (MvX (n), MvY(n)) (N is the total number of tracking points 1011), the coordinates of each tracking point 1021 after movement (X'(n), Y'(n)) are expressed using the following expressions (1) and (2). Accordingly, the positions of the tracking points 1021 after movement are confirmed.

$$X'(n)=X(n)+MvX(n) \quad (1)$$

$$Y'(n)=Y(n)+MvY(n) \quad (2)$$

To describe with reference to FIG. 3 again, the setting unit 240 next sets a region to be noted based on the positions of the tracking points after the movement (S115).

FIG. 9 is a diagram showing an example of setting a region to be noted in a tracking process according to the present embodiment. As shown in FIG. 9, the setting unit 240 draws a closed curve 1020 that interpolates the tracking points 1021 after the movement, and sets the region surrounded by the closed curve 1020 as a region to be noted 1002 of the captured image P2. Note that, even if the initial region to be noted 1001 set in the captured image P1 coincides with the cell image C2 included in the captured image P1, the contour of the cell image C2 included in the captured image P2 does not necessarily coincide with the closed curve 1020 defining the region to be noted 1002 set by the setting unit 240. In this case, the region to be noted 1002 can be set to coincide with the cell image C2 with higher accuracy by, for example, properly adjusting the number of tracking points, the disposition intervals, the tracking region, or the search range. In addition, the region to be noted 1002 set in Step S115 may be modified through an operation of the user via the input device that is not illustrated. For example, the shape of the closed curve 1020 or the positions of the tracking points 1021 after the movement may be modified through an operation of the user. Accordingly, even when there is an error in the setting of the region to be noted in the tracking process, the region to be noted can be properly modified.

To describe with reference to FIG. 3 again, the output control unit 250 next outputs the tracking points after the movement, the region to be noted set by the setting unit 240, and the like to the display unit D (S117). Note that the processes of Steps S107 to S115 described above may be performed without being displayed on the display unit D, or the processes of the respective steps may be sequentially displayed on the display unit D.

Next, the information processing device 20 determines whether or not the tracking process of Steps S107 to S117 is terminated (S119). The termination of the tracking process include, for example, completion of tracking processes on all frames of the dynamic image data, termination of the use of the information processing device 20 by the user, or the like. When the tracking process continues (No in S119), the disposition unit 220 re-disposes the tracking points for a region to be noted set by the setting unit 240 (S121).

FIG. 10 is a diagram showing an example of re-disposition of a tracking point in a tracking process according to the present embodiment. As shown in FIG. 10, because the tracking points 1021 (1021*a*, 1021*b*, 1021*c*, - - - ) on the closed curve 1020 defining the region to be noted 1002 set by the setting unit 240 move to the positions estimated by the estimation unit 230, unevenness arises in the disposition intervals of the tracking points. Thus, when positions of the tracking points 1021 are estimated for a captured image of another different frame using the tracking points 1021 after movement without change, it is difficult to track the shape of the cell in, for example, a portion in which the disposition intervals between the tracking points widen. In addition, when all of the tracking points are in proximity to each other, tracking regions overlap, which causes a trackable region to be reduced as a whole, and thus a range in which the shape of the cell can be tracked is limited.

Thus, the disposition unit 220 deletes the tracking points 1021, and disposes tracking points 1022 (1022*a*, 1022*b*, 1022*c*, - - - ) on the closed curve 1020 again. In the example shown in FIG. 10, the tracking points 1022 are disposed on the closed curve 1020 having a fixed interval. Accordingly, deviation of the positions at which the tracking points are disposed can be prevented, and accuracy of the tracking process can be maintained.

Note that disposition intervals between the tracking points re-disposed by the disposition unit 220 are not particularly limited as in Step S105. A method of disposing tracking points will be described below. In addition, although the tracking points 1022 are re-disposed on the closed curve 1020 in the example shown in FIG. 10, positions at which the tracking points 1022 are re-disposed are not particularly limited as long as the positions are associated with the region to be noted 1002. However, since a region to be noted is set using a curve interpolating tracking points in a setting process of the region to be noted by the setting unit 240, it is desirable to re-dispose the tracking points on a closed curve defining the region to be noted.

The information processing device 20 repetitively executes the processes of Steps S107 to S121 described above. By repeating the operation of setting a region to be noted corresponding to a region of a sequentially changing cell, re-disposition of tracking points for the set region to be noted, and estimation of positions of the redisposed tracking points in the captured image of another frame, it is possible to track a change in the shape of the cell.

(2.3. Effect)

The configuration example and the process example of the information processing device 20 according to an embodiment of the present disclosure have been described above. According to the present embodiment, the initial setting unit 215 sets the region to be noted corresponding to the region of the cell for the first captured image, the disposition unit 220 disposes tracking points for the set region to be noted, and the estimation unit 230 estimates positions of the disposed tracking points in the second captured image. Furthermore, according to the present embodiment, the setting unit 240 sets a region to be noted in the second captured image based on the estimated positions of the tracking points, and the disposition unit 220 re-disposes the tracking points for the set region to be noted. With this configuration, it is possible to re-dispose the tracking points according to the changing region to be noted at proper positions. Thus, a decrease in accuracy in the tracking process caused by separation or proximity of the tracking points can be prevented, and a change in the shape of the observation target can be tracked with high accuracy.

(2.4. Process Application Example)

Various processes performed by the information processing device 20 according to an embodiment of the present disclosure are not limited to the process example described above. An application example of processes performed by the disposition unit 220 and the estimation unit 230 of the information processing device 20 according to the present embodiment will be described below.

(Disposition Process Application Example 1: Adjustment of Disposition Intervals According to Shape)

First, a first application example of a disposition process (including a re-disposition process) by the disposition unit 220 will be described. The disposition unit 220 may decide disposition intervals between tracking points (as well as the number disposed) disposed on a line having a shape according to, for example, at least a part of the shape of the line defining a region to be noted. That is, the disposition unit 220 may increase or decrease the disposition intervals between the tracking points according to the shape.

FIG. 11 is a diagram for describing the first application example of the disposition process by the disposition unit 220 according to the present embodiment. As shown in FIG. 11, a region to be noted 1003 defined by a closed curve 1030 is set for a cell (not illustrated) that is an observation target on a captured image P3. Here, the curve out of the closed curve 1030 which is within the region surrounded by a two-dot chain line 1032 has a complicated shape in comparison to the curve outside the region. More specifically, the curve included in the region surrounded by the two-dot chain line 1032 is in a shape having high curvature in comparison to the curve outside the region.

As described above, the portion having high curvature is considered to be a portion with minute changes in the shape of the cell that is the observation target. Thus, the disposition unit 220 may decide the disposition intervals between tracking points 1031 according to the degree of curvature of the shape of the curve. More specifically, as shown in FIG. 11, the disposition unit 220 may decide the disposition intervals between the tracking points to be small for the portion of the shape of the curve having the high curvature (the curve included in the region surrounded by the two-dot chain line 1032) so that more tracking points are disposed. Accordingly, minute changes in the shape of the cell can be tracked. This disposition process may be applied to, for example, observation targets (cells) whose shape is likely to change minutely.

(Disposition Process Application Example 2: Adjustment of Disposition Intervals According to Luminance Information of Region to be Noted)

Next, a second application example of the disposition process by the disposition unit 220 will be described. The disposition unit 220 may decide disposition intervals between tracking points (as well as the number disposed) based on information regarding pixels included in a region to be noted. Here, the information regarding pixels included in a region to be noted may be, for example, luminance information of each pixel. In addition, the information regarding pixels is not limited to luminance information, and may be distribution of concentration of pixels, intensity of edges, or the like.

FIG. 12 is a diagram for describing the second application example of the disposition process by the disposition unit 220 according to the present embodiment. As shown in FIG. 12, a region to be noted 1004 (1004A and 1004B) defined by a closed curve 1040 is set on a captured image P4 for a cell (not illustrated) that is an observation target. Here, within the region to be noted 1004, luminance of the region to be noted 1004A is low, and luminance of the region to be noted 1004B is high.

In a region of a cell observed to exhibit high luminance, cell death is considered to have occurred. Since a change in the shape of the region in which cell death has occurred is minor (or no change is shown in the shape), the disposition unit 220 may increase the disposition intervals between the tracking points and reduce the number of tracking points disposed in the region having high luminance. Conversely, when the region exhibits low luminance, the cell is considered to be alive. Thus, the disposition unit 220 may decide to reduce the disposition intervals between the tracking points and increase the number of the tracking points disposed in the region having low luminance. By deciding the disposition intervals between the tracking points (as well as the number disposed) according to luminance as described above, it is possible to efficiently track the region whose shape can change. This disposition process may be applied to, for example, an observation target (a cell) of which cell death can occur.

Note that, although the disposition intervals between the tracking points have been described as being decided according to a level of luminance in the above-described example, the disposition intervals between the tracking points may be decided according to, for example, a variance of luminance. More specifically, a region having a high variance of luminance is considered to correspond to a region in which a cell that is an observation target is active. Thus, the disposition unit 220 may decide the disposition intervals between tracking points to be small and the number of tracking points disposed to be large for the region having a high variance of luminance. On the other hand, a region having a low variance of luminance is considered to correspond to a region in which a cell is inactive. Thus, the disposition unit 220 may decide the disposition intervals between tracking points to be large and the number of tracking points disposed to be small for the region having a low variance of luminance. Accordingly, the region in which the cell is active can be tracked more closely.

(Disposition Process Application Example 3: Adjustment of Disposition Intervals According to Motion Vector)

Next, a third application example of the disposition process by the disposition unit 220 will be described. The disposition unit 220 may decide disposition intervals between tracking points (as well as the number disposed) based on the magnitudes of motion vectors of respective tracking points estimated by the estimation unit 230 in a previous tracking process. The disposition unit 220 may acquire, for example, distribution of the magnitudes of the motion vectors of the tracking points and decide disposition intervals between the tracking points according to the distribution.

FIG. 13 is a diagram for describing the third application example of the disposition process by the disposition unit 220 according to the present embodiment. As shown in FIG. 13, a region to be noted 1006 defined by a closed curve 1060 is set on a captured image P5 for a cell (not illustrated) that is an observation target. Note that a closed curve 1050 indicated by the dotted line is a curve defining a region to be noted set in the captured image of one frame before the captured image P5. The closed curve 1050 has tracking points 1051 (1051*a*, 1051*b*, - - - ) disposed thereon for the region to be noted set in the previous captured image. The tracking points 1051 move to the positions calculated based on the motion vectors calculated by the estimation unit 230 (the tracking points after the movement are indicated as tracking points 1061). For example, the tracking point 1051*a* moves to the position at which the point turns into a tracking point 1061*a* (indicated by a dashed line) based on a motion vector M1*a*. Likewise, the tracking point 1051*b* moves to the position at which the point turns into a tracking point 1061*b* based on a motion vector M1*b*.

Here, the motion vector M1*a* is greater than the motion vector M1*b* as shown in FIG. 13. That is, the change in the shape in the periphery of the tracking point 1051*a* is considered to be greater than the change in the shape in the periphery of the tracking point 1051*b*. Thus, when tracking points of the region to be noted 1006 are to be redisposed after the region to be noted 1006 is set in the captured image P5 by the setting unit 240 based on the tracking points 1061 after the movement, the disposition unit 220 may re-dispose many tracking points in the periphery of the tracking points corresponding to high motion vectors. For example, as shown in FIG. 13, many tracking points 1062 are disposed in the periphery of the tracking point 1061*a* corresponding to the motion vector M1*a*. Meanwhile, disposition intervals between the tracking points 1062 are set to be large in the periphery of the tracking point 1061*b* corresponding to the motion vector M1*b*. By setting the tracking points according to the magnitudes of the motion vectors as described above, the region in which a cell is active can be tracked more closely.

(Estimation Process Application Example: Calculation of Movement Amount of Observation Target)

Next, an estimation process application example in which the process is performed by the estimation unit 230 will be described. The estimation unit 230 according to the present embodiment estimates positions of each of tracking points in another captured image, but at that time, the estimation unit 230 may further calculate a movement amount of an observation target using an estimation result. More specifically, the estimation unit 230 may calculate a movement amount of an observation target using a motion vector calculated for each of tracking points.

FIG. 14 is a diagram for describing the estimation process application example in which the process is performed by the estimation unit 230 according to the present embodiment. As shown in FIG. 14, tracking points 1081 (1081a, 1081b, - - - ) estimated by the estimation unit 230 and a region to be noted 1008 defined by a closed curve 1080 drawn by the setting unit 240 based on the tracking points 1081 are set on a captured image P6 for a cell (not illustrated) that is an observation target. In addition, tracking points 1071 (1071a, 1071b, - - - ) used to draw a closed curve 1070 indicated by the dotted line (which corresponds to a region to be noted 1007) are tracking points disposed in the captured image (not illustrated) that is a frame before the captured image P6. That is, the tracking points 1071 move to the positions calculated based on motion vectors calculated by the estimation unit 230 (tracking points after the movement are indicated as the tracking points 1081). The tracking point 1081a, for example, is a point that has moved from the original tracking point 1071a in the magnitude and direction of a motion vector M2a calculated by the estimation unit 230.

Here, as shown in FIG. 14, when the shape of the cell does not significantly change, the shape of each region to be noted set by the setting unit 240 does not significantly change. Thus, the motion vectors used in estimating the positions of the tracking points are considered to reflect a state of movement of the cell.

Thus, the estimation unit 230 may calculate the magnitude of the movement of the observation target from the motion vectors calculated for estimating the positions of the tracking points. For example, the estimation unit 230 may calculate a vector M3 indicating the movement of the observation target based on the motion vectors M2a, M2b, - - - that are calculated for the tracking points 1071a, 1071b, - - - as shown in FIG. 14. The vector M3 may be calculated based on, for example, a least square method for distribution of the motion vectors M2. This vector M3 may be output as a value of a motion of the observation target.

In addition, the estimation unit 230 may calculate not only a motion of the observation target in a translational direction but also rotation of the observation target based on the motion vectors M2 of the tracking points. For example, the estimation unit 230 may estimate a rotation center of the observation target based on the magnitude and direction of the motion vectors M2, and calculate the motion of the rotation based on the rotation center.

As described above, various motions of the observation target can be quantitatively analyzed based on the motion vectors calculated by the estimation unit 230. Accordingly, tracking of the observation can be evaluated in more detail.

(2.5. Modified Example)
(Analysis of Motion in Region to be Noted)

Next, a modified example of the information processing device 20 according to an embodiment of the present disclosure will be described. FIG. 15 is a block diagram showing a functional configuration example of an information processing device 20A according to the modified example of the embodiment of the present disclosure. Although the information processing device 20A according to the present modified example includes the image acquisition unit 210, the initial setting unit 215, the disposition unit 220, the estimation unit 230, the setting unit 240, and the output control unit 250 included in the information processing device 20 according to the present embodiment, an initial processing unit 255 and an analysis unit 260 can be included in place of the initial setting unit 215. More specifically, the information processing device 20A according to the present modified example can calculate a motion characteristic amount of the inside of a region to be noted specified in a tracking process using the analysis unit 260 based on a motion vector calculated by the initial processing unit 255.

(Initial Processing Unit)

The initial processing unit 255 has a function of analyzing motions and calculating motion vectors for a plurality of pieces of captured image data acquired by the image acquisition unit 210. The motion vectors calculated here do not mean motion vectors of tracking points disposed for the region to be noted described above, but means motion vectors of the inside of a frame of captured image data. Such motion vectors are used in calculation of a motion characteristic amount of the analysis unit 260 in the later stage. Captured image data for which motion vectors are subject to calculation may be frames of all acquired pieces of captured image (dynamic image) data, or frames of a section selected automatically or according to user's selection. Calculation of motion vectors is appropriately performed using a known algorithm such as block matching.

Note that the initial processing unit 255 can also have the function of the initial setting unit 215 described above. That is, the initial processing unit 255 can have a function of setting a region to be noted for an acquired captured image. Thus, the initial processing unit 255 can perform an initial setting process and the above-described motion vector calculation process for a region to be noted. An order of these processes is not particularly limited. The motion vector calculation process by the initial processing unit 255 is preferably performed before a tracking process of a later stage. This is in order to reduce a load imposed on the computation. Information with regard to the motion vectors obtained by the initial processing unit 255 can be output to the analysis unit 260 of the later stage.

(Analysis Unit)

The analysis unit 260 has a function of calculating a motion characteristic amount for a region to be noted set by the setting unit 240 in the tracking process. Specifically, the analysis unit 260 specifies a motion vector of the inside of the region to be noted set by the setting unit 240 among motion vectors calculated by the initial processing unit 255 in advance, and calculates a motion characteristic amount for the region to be noted based on the specified motion vector.

The motion characteristic amount is, for example, at least one of a motion amount, a motion region, an average motion amount, a standard deviation of motion amounts, acceleration, a motion direction, and a motion frequency. These motion characteristic amounts are appropriately calculated using a known algorithm or the like.

In addition, the calculated motion characteristic amount is output to the output control unit 250. An output form of the motion characteristic amount is appropriately selected according to a property of a motion to be analyzed, like a time-series graph, two-dimensional mapping, a radar chart, or a histogram.

By analyzing motions for a region to be noted as described above, not only motions to be observed corresponding to the region to be noted can be simply tracked, but characteristic motions to be observed can also be quantitatively evaluated. In addition, by calculating motion vectors in advance prior to a tracking process, a computation load can be reduced, rather than simultaneously performing a tracking process and a motion vector calculation process. Thus, the tracking process can be performed more quickly.

(Process Flow)

FIG. 16 is a flowchart showing an example of a process by the information processing device 20A according to the present modified example. Referring to FIG. 16, the image acquisition unit 210 first acquires dynamic image data (captured image data) (S201). Next, the initial processing unit 255 calculates motion vectors for the dynamic image data (S203).

Next, the initial processing unit 255 sets a region to be noted for one captured image (S205), and the disposition unit 220 disposes tracking points in the region to be noted (S207). Then, the estimation unit 230 sets tracking regions around the tracking points and search ranges of the tracking regions (S209).

Next, the image acquisition unit 210 acquires an image of the next frame of the one captured image for which the region to be noted has been set (S211), and the estimation unit 230 estimates positions of the tracking points in the image (S213). Then, the setting unit 240 sets a region to be noted based on the positions of the tracking points that have undergone the tracking process (S215). Furthermore, the analysis unit 260 calculates a motion characteristic amount of the set region to be noted based on motion vectors of the inside of the region to be noted, and outputs the calculated motion characteristic amount in a predetermined form (S217).

The tracking process and the motion characteristic amount calculation process (S209 to S217) are repeated until their termination (S219). Note that, when the tracking process continues in Step S219 (No in S219), tracking points are re-disposed for the region to be noted set by the disposition unit 220 after the tracking process (S221).

(2.6. Device Application Examples)

Next, application examples of the information processing device 20 according to an embodiment of the present disclosure will be described.

(Application Example 1: Nerve Cell)

For the information processing device 20 according to the present embodiment, a cell which changes its form significantly in a short period of time is a main processing target. First, a first application example of the information processing device 20 according to the present embodiment will be described.

FIG. 17 is a diagram for describing the first application example (nerve cell) of the information processing device 20 according to the present embodiment. As shown in FIG. 17, the nerve cell C10 that is an observation target in the present application example is composed of a cyton C10A and an axon C10B (note that, for the sake of convenience in description, other elements such as a dendrite and a nucleus composing the nerve cell C10 are omitted in the present application example). The nerve cell C10 elongates the axon C10B toward another cell in order to form a neural circuit. That is, the axon C10B in the nerve cell C10 grows in a short period of time. By using the information processing device 20 according to the present embodiment, the growth of the axon C10B can thus be tracked.

As shown in FIG. 17, a region to be noted 3000 can be set in accordance with the shape and elongation direction of the axon C10B by, for example, disposing the tracking point 3001 to overlap the axon C10B. In the example shown in FIG. 17, the region to be noted 3000 is defined by a straight line or a curve. In this case, in order to track growth of the axon C10B, it is desirable to dispose the tracking point 3001 at least at the tip of the axon C10B and the boundary of the cyton C10A and the axon C10B. Note that this region to be noted 3000 may be defined using a planar region according to the shape of the axon C10B.

FIG. 18 is a diagram showing an example of an initial setting process of an axon C11B by the information processing device 20 according to the present embodiment. As shown in FIG. 18, a region to be noted 3010 is set to overlap the axon C11B of a nerve cell C11. In addition, among tracking points 3011 defining the region to be noted 3010, the tracking point 3011a is disposed on the boundary of a cyton C11A and the axon C11B, and the tracking point 3011c is disposed at the tip of the axon C11B.

FIG. 19 is a diagram showing an example of a tracking process of the axon C1B by the information processing device 20 according to the present embodiment. The axon C11B is in a state in which it has elongated in the length direction of the axon C11B from the state shown in FIG. 18. At this time, the tracking points 3011 move to positions estimated by the estimation unit 230. For example, the tracking point 3011c moves to the position corresponding to the tip of the axon C11B. On the other hand, the tracking point 3011a moves to the position corresponding to the boundary of the cyton C11A and the axon C11B (the case in which it does not move is also considered). Then, a region to be noted 3020 is set by the setting unit 240 based on the tracking points 3011 after the movement. Then, new tracking points 3021 are disposed by the disposition unit 220 for the region to be noted 3020. Note that tracking points 3021a and 3021f are re-disposed at the same positions as the foregoing tracking points 3011a and 3011c at the tip of the axon C11B and on the boundary of the cyton C11A and the axon C11B. In addition, as shown in FIG. 19, the number of tracking points redisposed by the disposition unit 220 may increase according to elongation of the axon C11B.

By repetitively executing the above-described tracking process with respect to the axon C11B, the elongation of the axon C11B can be tracked.

(Application Example 2: Zebrafish)

An application target of the information processing device 20 according to the present embodiment is not limited to cells as described above. The application target may be, for example, animals, plants, or non-living structures. When such an application target significantly changes its shape or structure in a short period of time, the tracking process by the information processing device 20 according to the present embodiment is effective. A second application example of the information processing device 20 according to the present embodiment will be described below.

FIG. 20 is a diagram for describing the second application example (zebrafish) of the information processing device 20 according to the present embodiment. Zebrafish, like a zebrafish C20 that is an observation target in the present application example, are not kept only as pets but are frequently used for biological research as a model vertebrate organism. That is, observation and evaluation of changes in the form of zebrafish like the zebrafish C20 are frequently performed. Thus, if the information processing device 20 according to the present embodiment is used, growth and changes in the form of the zebrafish C20 can be objectively tracked.

As shown FIG. 18, the zebrafish C20 has an eye C20A and a backbone C20B. In an initial setting process, a region to be noted 4000A surrounding the eye C20A and a region to be noted 4000B formed along the shape of the backbone C2OB are set by disposing tracking points 4001 on the contour of the eye C20A and on the backbone C20B.

The region to be noted 4000B is set to track motions of the backbone C20B. Thus, using the information processing device 20 according to the present embodiment, dynamic states of the zebrafish C20 can be tracked. In addition, the region to be noted 4000A is set on the contour of the eye C20A. The shape of the eye C20A shows no particularly significant change. Thus, having the region to be noted 4000A surrounding the eye C20A as a fixed region, relative dynamic states or changes in the form of the region to be noted 4000B can be tracked. With reference to the position of a tracking point 4001c connecting the regions to be noted 4000A and 4000B, relative motions of a tracking point 4001a may be calculated. Accordingly, it is possible to distinctively track dynamic states of the zebrafish C20 and dynamic states or changes in the shape of each element (for example, the backbone C20B) that the zebrafish C20 has. Therefore, even when the zebrafish C20 continuously makes minute movements, it is possible to objectively track changes in the form of the zebrafish C20 or dynamic states or changes in the form of each element that the zebrafish C20 has.

(Application Example 3: Colony)

An application target (observation target) of the information processing device 20 according to the present embodiment may not only be one structure described above, but also a group constituted by a plurality of structures. When such an application target significantly changes its shape or structure as a group in a short period of time, the tracking process by the information processing device 20 according to the present embodiment is useful. A third application example of the information processing device 20 according to the present embodiment will be described.

FIG. 21 is a diagram for describing the third application example of the information processing device 20 (to a colony) according to the present embodiment. The colony C30 that is an observation target in the present application example is a group derived from a single species formed by bacteria, cells or the like in a cultivation process. By observing a change in the shape of the colony C30, characteristics of individual cells, bacteria or the like or an effect of treatment for the observation target can be evaluated. For example, a colony forming ability of cells that are differentiated from ES cells can be evaluated, or drug efficacy can be evaluated based on a proliferation ability of the colony C30 of cancer cells into which a medicine has been put.

When an observation target is the colony C30, the outermost contour of the colony C30 is preferably set as a region to be noted 5000 with tracking points 5001 disposed at the outermost side of the colony C30 as shown in FIG. 21. Here, a shape of the colony C30 complicatedly changes due to overall expansion caused by a cell division of a colony inside C31 and projection of a partial contour caused by a change in cells near an outer periphery C32. Thus, it is necessary for the colony C30 to dispose the tracking points 5001 in balance. For example, by setting intervals between the tracking points 5001 to be the same as or narrower than the width of one cell constituting the colony C30, the complicated changes in the shape of the colony C30 can be tracked.

(Application Example 4: Macrophage, and Foreign Body Such as Cancer Cell)

The information processing device 20 according to the present embodiment may not only set one kind of structure alone to be an application target for one piece of captured image data but also set a plurality of different kinds of structures as application targets. When these application targets interact and thus change their shapes and structures significantly in a short period of time, the tracking process by the information processing device 20 according to the present embodiment is useful. A fourth application example of the information processing device 20 according to the present embodiment will be described below.

FIG. 22 is a diagram for describing the fourth application example of the information processing device 20 (to a macrophage and a foreign body) according to the present embodiment. A macrophage C40 that is an observation target in the present application example is a white blood cell that migrates inside a living body, and brings phagocytosis in which the cell predates and digests dead cells, denaturing materials inside a body, or foreign bodies such as bacteria. When the macrophage C40 is set as an application target, migration of the macrophage C40 and changes in the shape of the macrophage C40 are caught, motions of the macrophage C40 in phagocytosis are analyzed, and thereby a phagocytosis ability of the macrophage C40 can be evaluated.

When an observation target is the macrophage C40 as shown in FIG. 22 and phagocytosis of the macrophage C40 is desired to be evaluated, it is preferable to dispose tracking points 6001 and 7001 respectively on contours of the macrophage C40 and a foreign body C50 such as a cancer cell and set the outermost contours of the macrophage C40 and the foreign body C50 as regions to be noted 6000 and 7000. Since the macrophage C40 significantly changes its shape in a phagocytic process, it is desirable to increase the number of tracking points 6001 disposed and reduce disposition intervals 6002. Meanwhile, since the foreign body C50 hardly changes its shape in a phagocytic process, it is preferable to reduce the number of tracking points 7001 disposed and increase disposition intervals 7002. In addition, the tracking points 7001 do not have to be re-disposed for the foreign body C50 in a tracking process. Accordingly, a computation load can be reduced, and tracking processes appropriate for respective cells can be performed.

As shown in the application examples described above, the disposition unit 220 of the information processing device 20 according to the present embodiment may appropriately decide disposition intervals between respective tracking points based on information with regard to an observation target for which a region to be noted is set (for example, a type of the observation target, the number of observation targets, or a state such as active or inactive). Accordingly, while a computation load is reduced, tracking processes appropriate for respective observation targets can be performed.

3. HARDWARE CONFIGURATION

Next, with reference to FIG. 23, a hardware configuration of an information processing device according to an embodiment of the present disclosure is described. FIG. 23 is a block diagram showing a hardware configuration example of the information processing device according to the embodiment of the present disclosure. An illustrated information processing device 900 can realize the information processing device 20 in the above described embodiment.

The information processing device 900 includes a central processing unit (CPU) 901, read only memory (ROM) 903, and random access memory (RAM) 905. In addition, the information processing device 900 may include a host bus 907, a bridge 909, an external bus 911, an interface 913, an input device 915, an output device 917, a storage device 919, a drive 921, a connection port 925, and a communication device 929. The information processing device 900 may include a processing circuit such as a digital signal processor (DSP) or an application-specific integrated circuit (ASIC), instead of or in addition to the CPU 901.

The CPU 901 functions as an arithmetic processing device and a control device, and controls the overall operation or a part of the operation of the information processing device 900 according to various programs recorded in the ROM 903, the RAM 905, the storage device 919, or a removable recording medium 923. For example, the CPU 901 controls overall operations of respective function units included in the information processing device 20 of the above-described embodiment. The ROM 903 stores programs, operation parameters, and the like used by the CPU 901. The RAM 905 transiently stores programs used when the CPU 901 is executed, and parameters that change as appropriate when executing such programs. The CPU 901, the ROM 903, and the RAM 905 are connected with each other via the host bus 907 configured from an internal bus such as a CPU bus or the like. The host bus 907 is connected to the external bus 911 such as a Peripheral Component Interconnect/Interface (PCI) bus via the bridge 909.

The input device 915 is a device operated by a user such as a mouse, a keyboard, a touchscreen, a button, a switch, and a lever. The input device 915 may be a remote control device that uses, for example, infrared radiation and another type of radio waves. Alternatively, the input device 915 may be an external connection device 927 such as a mobile phone that corresponds to an operation of the information processing device 900. The input device 915 includes an input control circuit that generates input signals on the basis of information which is input by a user to output the generated input signals to the CPU 901. The user inputs various types of data and indicates a processing operation to the information processing device 900 by operating the input device 915.

The output device 917 includes a device that can visually or audibly report acquired information to a user. The output device 917 may be, for example, a display device such as a LCD, a PDP, and an OELD, an audio output device such as a speaker and a headphone, and a printer. The output device 917 outputs a result obtained through a process performed by the information processing device 900, in the form of text or video such as an image, or sounds such as audio sounds.

The storage device 919 is a device for data storage that is an example of a storage unit of the information processing device 900. The storage device 919 includes, for example, a magnetic storage device such as a hard disk drive (HDD), a semiconductor storage device, an optical storage device, or a magneto-optical storage device. The storage device 919 stores therein the programs and various data executed by the CPU 901, and various data acquired from an outside.

The drive 921 is a reader/writer for the removable recording medium 923 such as a magnetic disk, an optical disc, a magneto-optical disk, and a semiconductor memory, and built in or externally attached to the information processing device 900. The drive 921 reads out information recorded on the mounted removable recording medium 923, and outputs the information to the RAM 905. The drive 921 writes the record into the mounted removable recording medium 923.

The connection port 925 is a port used to directly connect devices to the information processing device 900. The connection port 925 may be a Universal Serial Bus (USB) port, an IEEE1394 port, or a Small Computer System Interface (SCSI) port, for example. The connection port 925 may also be an RS-232C port, an optical audio terminal, a High-Definition Multimedia Interface (HDMI (registered trademark)) port, and so on. The connection of the external connection device 927 to the connection port 925 makes it possible to exchange various kinds of data between the information processing device 900 and the external connection device 927.

The communication device 929 is a communication interface including, for example, a communication device for connection to a communication network NW. The communication device 929 may be, for example, a wired or wireless local area network (LAN), Bluetooth (registered trademark), or a communication card for a wireless USB (WUSB). The communication device 929 may also be, for example, a router for optical communication, a router for asymmetric digital subscriber line (ADSL), or a modem for various types of communication. For example, the communication device 929 transmits and receives signals in the Internet or transits signals to and receives signals from another communication device by using a predetermined protocol such as TCP/IP. The communication network NW to which the communication device 929 connects is a network established through wired or wireless connection. The communication network NW is, for example, the Internet, a home LAN, infrared communication, radio wave communication, or satellite communication.

The example of the hardware configuration of the information processing device 900 has been described. Each of the structural elements described above may be configured by using a general purpose component or may be configured by hardware specialized for the function of each of the structural elements. The configuration may be changed as necessary in accordance with the state of the art at the time of working of the present disclosure.

4. CONCLUSION

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, although the information processing system 1 is configured to be provided with the imaging device 10 and information processing device 20 in the above-described embodiment, the present technology is not limited thereto. For example, the imaging device 10 may have the function of the information processing device 20 (tracking function). In this case, the information processing system 1 is realized by the imaging device 10. In addition, the information processing device 20 may have the function of the imaging device 10 (imaging function). In this case, the information processing system 1 is realized by the information processing device 20. Further, the imaging device 10 may have a part of the function of the information processing device 20, and the information processing device 20 may have a part of the function of the imaging device 10.

In addition, although a cell is exemplified as an observation target for analysis of the information processing system 1 in the embodiments, the present technology is not limited thereto. The observation target may be, for example, a cell organelle, a biological tissue, an organ, a human, an animal, a plant, a non-living structure, or the like, and when the structure of shape thereof change in a short period of time, changes of the observation targets can be tracked using the information processing system 1.

The steps in the processes performed by the information processing device in the present specification may not necessarily be processed chronologically in the orders described in the flowcharts. For example, the steps in the processes performed by the information processing device may be processed in different orders from the orders described in the flowcharts or may be processed in parallel.

Also, a computer program causing hardware such as the CPU, the ROM, and the RAM included in the information processing device to carry out the equivalent functions as the above-described configuration of the information processing device provided with an adjustment instruction specifying unit can be generated. Also, a storage medium having the computer program stored therein can be provided.

In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the present technology may also be configured as below.

(1)

An information processing device including:
circuitry configured to:
dispose a plurality of tracking points within a first region of a first image;
set a second region of a second image based on estimated positions of the plurality of tracking points in the second image, wherein the estimated positions are determined by comparing the first image and the second image, and the second image is captured at a different time point than the first image; and
re-dispose the plurality of tracking points within the second region of the second image.

(2)

The information processing device according to (1), wherein disposing the plurality of tracking points comprises disposing the plurality of tracking points on a line defining the first region of the first image.

(3)

The information processing device according to (2), wherein disposing the plurality of tracking points comprises determining disposition intervals between the plurality of tracking points based on a shape of at least part of the line.

(4)

The information processing device according to (3), wherein determining disposition intervals between the plurality of tracking points comprises determining the disposition intervals based on a curvature of the shape.

(5)

The information processing device according to (2), wherein the line defining the first region is a closed curve surrounding the first region.

(6)

The information processing device according to (1), wherein disposing the plurality of tracking points comprises determining disposition intervals between the plurality of tracking points based on pixel information for pixels included within the first region.

(7)

The information processing device according to (6), wherein the pixel information includes luminance information.

(8)

The information processing device according to (1), wherein re-disposing the plurality of tracking points within the second region comprises disposing at least one of the plurality of tracking points at the same position as one of the estimated positions.

(9)

The information processing device according to (1), wherein the positions of the plurality of tracking points are estimated in the second image by comparing the first image and the second image to obtain a motion vector and estimating positions of the plurality of tracking points based on the motion vector.

(10)

The information processing device according to (9), wherein obtaining the motion vector comprises setting a tracking region that includes at least one tracking point of the plurality of tracking points in the first image and searching a predetermined search range for a position of the tracking region in the second image.

(11)

The information processing device according to (10), wherein a size of the tracking region is a size determined based on information of an observation target in the first region.

(12)

The information processing device according to (10), wherein a size of the search range is determined based on information of an observation target in the first region.

(13)

The information processing device according to (9), wherein estimating positions of the plurality of tracking points further comprises calculating a movement amount of an observation target between the first image and the second image based on the motion vector.

(14)

The information processing device according to (9), wherein re-disposing the plurality of tracking points further comprises determining disposition intervals between the plurality of tracking points based on the motion vector.

(15)

The information processing device according to (1), wherein the positions of the plurality of tracking points are estimated in the second image based on information of an observation target in the first region of the first image.

(16)

The information processing device according to (1), wherein setting the second region of the second image further comprises using pixel information of the first image.

(17)

The information processing device according to (1), wherein disposing the plurality of tracking points within the first region of the first image comprises disposing the plurality of tracking points relative to an observation target within the first region, and setting the second region of the second image further comprises setting the second region to include at least a portion of the observation target.

(18)

The information processing device according to (17), wherein the observation target includes at least a portion of a biological cell.

(19)

The information processing device according to (18), wherein re-disposing the plurality of tracking points further comprises re-disposing the plurality of tracking points in a manner to adjust for a change in shape of the biological cell.

(20)

The information processing device according to (17), wherein estimating the positions of the plurality of tracking points in the second image further comprises adjusting the positions of the plurality of tracking points in the first image based on movement of the observation target between the first image and the second image.

(21)

The information processing device according to (1), wherein re-disposing the plurality of tracking points within the second region of the second image comprises using at least one of the estimated positions of the plurality of tracking points in the second image.

(22)

An information processing method including:

disposing a plurality of tracking points within a first region of a first image;

setting a second region of a second image based on estimated positions of the plurality of tracking points in the second image, wherein the estimated positions are determined by comparing the first image and the second image, and the second image is captured at a different time point than the first image; and re-disposing the plurality of tracking points within the second region of the second image.

(23)

An information processing system including:

an imaging device configured to generate a plurality of images including a first image and a second image; and circuitry configured to:

dispose a plurality of tracking points within a first region of a first image;

set a second region of a second image based on estimated positions of the plurality of tracking points in the second image, wherein the estimated positions are determined by comparing the first image and the second image, and the second image is captured at a different time point than the first image; and re-dispose the plurality of tracking points within the second region of the second image.

(24)

An information processing device including:

a disposition unit that disposes a plurality of tracking points for a region to be noted in a captured image;

an estimation unit that estimates, based on comparison of the captured image and another captured image of which a capturing time point is different from a capturing time point of the captured image, positions of the tracking points in the other captured image; and a setting unit that sets a region to be noted in the other captured image based on the positions of the tracking points estimated by the estimation unit, wherein, when the region to be noted is set in the captured image by the setting unit, the disposition unit re-disposes the tracking points for the set region to be noted, and the estimation unit estimates positions of the re-disposed tracking points in the other captured image.

(25)

The information processing device according to (24), wherein the disposition unit disposes the plurality of tracking points on a line defining the region to be noted.

(26)

The information processing device according to (25), wherein, according to a shape of at least a part of the line defining the region to be noted, the disposition unit decides disposition intervals between the plurality of tracking points to be disposed on a line having the shape.

(27)

The information processing device according to (26), wherein the disposition unit decides the disposition intervals between the plurality of tracking points according to a curvature of the shape.

(28)

The information processing device according to any one of (25) to (27), wherein the disposition unit decides disposition intervals between the plurality of tracking points based on information with regard to pixels included in the region to be noted in the captured image.

(29)

The information processing device according to (28), wherein the information with regard to the pixels includes luminance information.

(30)

The information processing device according to any one of (25) to (29), wherein the disposition unit decides disposition intervals between the plurality of tracking points based on information with regard to an observation target corresponding to the region to be noted (31)

The information processing device according to any one of (25) to (30), wherein the line defining the region to be noted is a closed curve surrounding the region to be noted.

(32)

The information processing device according to any one of (24) to (31), wherein the disposition unit re-disposes at least one tracking point among the previously disposed tracking points at the same position as the position estimated by the estimation unit.

(33)

The information processing device according to any one of (24) to (32), wherein the estimation unit estimates positions of the tracking points in the other captured image based on a motion vector obtained by comparing the captured image and the other captured image.

(34)

The information processing device according to (33), wherein, for a tracking region within the captured image including the tracking points, the estimation unit calculates the motion vector by searching a predetermined search range for a position of the tracking region in the other captured image.

(35)

The information processing device according to (34), wherein a size of the tracking region is a size decided based on information with regard to an observation target corresponding to the region to be noted.

(36)

The information processing device according to (34) or (35), wherein a size of the search range is a size decided based on information with regard to an observation target corresponding to the region to be noted.

(37)

The information processing device according to any one of (33) to (36), wherein the estimation unit calculates a movement amount of an observation target corresponding to the region to be noted based on the motion vector.

(38)

The information processing device according to any one of (33) to (37), wherein the disposition unit decides disposition intervals between the plurality of tracking points based on the magnitude of the motion vector.

(39)

The information processing device according to any one of (24) to (38), further including:

an analysis unit configured to calculate a motion characteristic amount of the inside of the region to be noted using a motion vector obtained through analysis of each of the captured images.

(40)

The information processing device according to any one of (24) to (39), wherein the estimation unit estimates positions of the tracking points in the other captured image captured at a capturing time point decided based on information with regard to an observation target corresponding to the region to be noted.

(41)

The information processing device according to any one of (24) to (40), wherein the setting unit sets the region to be noted using information with regard to pixels included in the captured image.

(42)

An information processing method performed by a processor, the information processing method including:

disposing a plurality of tracking points for a region to be noted in a captured image;

estimating, based on comparison of the captured image and another captured image of which a capturing time point is different from a capturing time point of the captured image, positions of the tracking points in the other captured image; and setting a region to be noted in the other captured image based on the estimated positions of the tracking points, wherein, when the processor sets the region to be noted in the captured image, the processor re-disposes the tracking points for the set region to be noted, and estimates positions of the re-disposed tracking points in the other captured image.

(43)

An information processing system including:

an imaging device that is provided with an imaging unit that generates a plurality of captured images; and an information processing device that is provided with a disposition unit that disposes a plurality of tracking points for a region to be noted in one captured image acquired from the imaging unit, an estimation unit that estimates, based on comparison of the one captured image and another captured image of which a capturing time point of the imaging unit is different from a capturing time point of the one captured image, positions of the tracking points in the other captured image, and a setting unit that sets a region to be noted in the other captured image based on the estimated positions of the tracking points, wherein, when the region to be noted is set in the one captured image by the setting unit, the disposition unit re-disposes the tracking points for the set region to be noted, and the estimation unit estimates positions of the re-disposed tracking points in the other captured image.

REFERENCE SIGNS LIST

1 information processing system
10 imaging device
20 information processing device
210 image acquisition unit
215 initial setting unit
220 disposition unit
230 estimation unit
240 setting unit
250 output control unit
255 initial processing unit
260 analysis unit

The invention claimed is:

1. An information processing device comprising:
circuitry configured to:
dispose a first plurality of tracking points within a first region of a first image;
estimate positions of a second plurality of tracking points in a second image based at least in part on obtaining motion vectors for at least some of the first plurality of tracking points by comparing the first image and the second image, wherein the second image is captured at a different time point than the first image;
set a second region of the second image based on the second plurality of tracking points;
dispose a third plurality of tracking points within the second region of the second image; and
track an observation target based at least in part on the first plurality of tracking points and the third plurality of tracking points.

2. The information processing device of claim 1, wherein disposing the first plurality of tracking points comprises disposing the first plurality of tracking points on a line defining the first region of the first image.

3. The information processing device of claim 2, wherein disposing the first plurality of tracking points comprises determining disposition intervals between the first plurality of tracking points based on a shape of at least part of the line.

4. The information processing device of claim 3, wherein determining disposition intervals between the first plurality of tracking points comprises determining the disposition intervals based on a curvature of the shape.

5. The information processing device of claim 2, wherein the line defining the first region is a closed curve surrounding the first region.

6. The information processing device of claim 1, wherein disposing the first plurality of tracking points comprises determining disposition intervals between the first plurality of tracking points based on pixel information for pixels included within the first region.

7. The information processing device of claim 6, wherein the pixel information includes luminance information.

8. The information processing device of claim 1, wherein re disposing the third plurality of tracking points within the second region comprises disposing at least one of the third plurality of tracking points at the same position as one of the second plurality of tracking points.

9. The information processing device of claim 1, wherein estimating positions of the second plurality of tracking points further comprises obtaining a motion vector for each of one or more of the first plurality of tracking points.

10. The information processing device of claim 1, wherein obtaining the motion vectors comprises setting a tracking region that includes at least one tracking point of the first plurality of tracking points in the first image and searching a predetermined search range for a position of the tracking region in the second image.

11. The information processing device of claim 10, wherein a size of the tracking region is a size determined based on information of an observation target in the first region.

12. The information processing device of claim 10, wherein a size of the search range is determined based on information of an observation target in the first region.

13. The information processing device of claim 1, wherein estimating positions of the second plurality of tracking points further comprises calculating a movement amount of the observation target between the first image and the second image based on at least one motion vector.

14. The information processing device of claim 1, wherein disposing the third plurality of tracking points further comprises determining disposition intervals between the third plurality of tracking points based on at least one motion vector.

15. The information processing device of claim 1, wherein estimating positions of the second plurality of tracking points is further based on information of the observation target in the first region of the first image.

16. The information processing device of claim 1, wherein setting the second region of the second image further comprises using pixel information of the first image.

17. The information processing device of claim 1, wherein disposing the first plurality of tracking points within the first region of the first image comprises disposing the first plurality of tracking points relative to the observation target within the first region, and setting the second region of the second image further comprises setting the second region to include at least a portion of the observation target.

18. The information processing device of claim 17, wherein the observation target includes at least a portion of a biological cell.

19. The information processing device of claim 18, wherein re disposing the third plurality of tracking points further comprises disposing the third plurality of tracking points in a manner to adjust for a change in shape of the biological cell.

20. The information processing device of claim 17, wherein estimating positions of the second plurality of tracking points in the second image further comprises adjusting positions of the first plurality of tracking points in the first image based on movement of the observation target between the first image and the second image.

21. The information processing device of claim 1, wherein disposing the third plurality of tracking points within the second region of the second image comprises using at least one of the estimated positions of the second plurality of tracking points in the second image.

22. An information processing method comprising:
disposing a first plurality of tracking points within a first region of a first image;
estimating positions of a second plurality of tracking points in a second image based at least in part on obtaining motion vectors for at least some of the first plurality of tracking points by comparing the first image and the second image, wherein the second image is captured at a different time point than the first image;
setting a second region of the second image based on the second plurality of tracking points;
disposing a third plurality of tracking points within the second region of the second image; and
tracking an observation target based at least in part on the first plurality of tracking points and the third plurality of tracking points.

23. An information processing system comprising:
an imaging device configured to generate a plurality of images including a first image and a second image; and
circuitry configured to:
dispose a first plurality of tracking points within a first region of the first image;
estimate positions of a second plurality of tracking points in the second image based at least in part on obtaining motion vectors for at least some of the first plurality of tracking points by comparing the first image and the second image, wherein the second image is captured at a different time point than the first image;
set a second region of the second image based on the second plurality of tracking points;
dispose a third plurality of tracking points within the second region of the second image; and
track an observation target based at least in part on the first plurality of tracking points and the third plurality of tracking points.

* * * * *